United States Patent
Stanimirovic et al.

(10) Patent No.: US 11,727,661 B2
(45) Date of Patent: Aug. 15, 2023

(54) METHOD AND SYSTEM FOR DETERMINING AT LEAST ONE PROPERTY RELATED TO AT LEAST PART OF A REAL ENVIRONMENT

(71) Applicant: Apple Inc., Cupertino, CA (US)

(72) Inventors: Darko Stanimirovic, Backa Topola (RS); Daniel Kurz, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/878,296

(22) Filed: May 19, 2020

(65) Prior Publication Data

US 2020/0279121 A1 Sep. 3, 2020

Related U.S. Application Data

(63) Continuation of application No. 15/516,548, filed as application No. PCT/EP2014/071032 on Oct. 1, 2014, now Pat. No. 10,719,727.

(51) Int. Cl.
*G06T 7/11* (2017.01)
*G06V 10/143* (2022.01)
(Continued)

(52) U.S. Cl.
CPC .............. *G06V 10/143* (2022.01); *G06T 7/11* (2017.01); *G06T 7/248* (2017.01); *G06T 7/74* (2017.01);
(Continued)

(58) Field of Classification Search
CPC combination set(s) only.
See application file for complete search history.

(56) References Cited

U.S. PATENT DOCUMENTS 5,557,684 A 9/1996 Wang
7,831,087 B2 * 11/2010 Harville .............. G06V 40/103
382/209
(Continued)

FOREIGN PATENT DOCUMENTS

CN 102612704 A 10/2014
CN 103597513 A 10/2014
(Continued)

OTHER PUBLICATIONS

Carlos R. del Blanco, Fernando Jaureguizar, Luis Salgado, and Narciso Garcia, "Target detection through robust motion segmentation and tracking restrictions in aerial flir images," In ICIP (5), pp. 445-448, IEEE, 2007.
(Continued)

*Primary Examiner* — Tsung Yin Tsai
(74) *Attorney, Agent, or Firm* — Blank Rome LLP

(57) ABSTRACT

A method for determining at least one property related to at least part of a real environment comprises receiving a first image of a first part of a real environment captured by a first camera, wherein the first camera is a thermal camera and the first image is a thermal image and the first part of the real environment is a first environment part, providing at least one description related to at least one class of real objects, wherein the at least one description includes at least one thermal property related to the at least one class of real objects, receiving a second image of the first environment part and of a second part of the real environment captured by a second camera, wherein the second part of the real environment is a second environment part, providing an image alignment between the first image and the second image, determining, for at least one second image region contained in the second image, at least one second probability according to the image alignment, pixel information of the first image, and the at least one description, wherein (Continued)

the at least one second probability relates to the at least one class of real objects, and wherein the at least one second image region comprises at least part of the first environment part, determining at least one image feature derived from pixel information of at least one third image region contained in the second image according to the at least one second probability, wherein the at least one third image region comprises at least part of the second environment part, and performing at least one computer vision method to determine at least one property related to at least part of the second environment part according to the determined at least one image feature.

20 Claims, 8 Drawing Sheets

(51) Int. Cl.
 *G06T 7/73* (2017.01)
 *G06T 7/246* (2017.01)
 *G06V 40/16* (2022.01)

(52) U.S. Cl.
 CPC .............. *G06T 2207/10048* (2013.01); *G06T 2207/20076* (2013.01); *G06T 2207/20212* (2013.01); *G06V 40/161* (2022.01)

(56) References Cited

U.S. PATENT DOCUMENTS

| | | | |
|---|---|---|---|
| 8,401,783 B2 | 3/2013 | Hyung | |
| 9,002,098 B1* | 4/2015 | Chelian | G06V 10/422 382/153 |
| 9,310,251 B2 | 4/2016 | Das | |
| 9,520,040 B2* | 12/2016 | Mavromatis | H04N 13/243 |
| 10,719,727 B2* | 7/2020 | Stanimirovic | G06T 7/74 |
| 10,877,605 B2* | 12/2020 | Kurz | G06F 3/011 |
| 2002/0091991 A1* | 7/2002 | Castro | G06F 9/06 717/106 |
| 2005/0069207 A1* | 3/2005 | Zakrzewski | G06V 20/52 382/218 |
| 2005/0094879 A1* | 5/2005 | Harville | G06V 40/103 382/209 |
| 2006/0245631 A1* | 11/2006 | Levenson | G06F 18/2135 382/133 |
| 2006/0257024 A1* | 11/2006 | Hahn | G06V 20/56 382/181 |
| 2008/0036576 A1* | 2/2008 | Stein | G06V 20/584 340/425.5 |
| 2008/0199045 A1* | 8/2008 | Ekin | G06V 20/56 382/104 |
| 2010/0128110 A1* | 5/2010 | Mavromatis | G08B 13/19641 348/E13.001 |
| 2010/0172567 A1* | 7/2010 | Prokoski | A61B 5/418 382/132 |
| 2012/0219188 A1 | 8/2012 | Kurz | |
| 2012/0320219 A1* | 12/2012 | David | G01S 17/89 348/169 |
| 2013/0336531 A1* | 12/2013 | Bobbitt | G06V 40/20 382/103 |
| 2014/0086494 A1 | 3/2014 | BenHimane | |
| 2014/0368646 A1* | 12/2014 | Traff | H04N 7/181 348/143 |
| 2015/0145992 A1* | 5/2015 | Traff | G06V 20/00 348/143 |
| 2015/0234454 A1* | 8/2015 | Kurz | G06F 3/0425 345/156 |
| 2016/0035093 A1* | 2/2016 | Kateb | G02B 21/0012 382/131 |
| 2016/0323517 A1* | 11/2016 | Long | G06V 20/52 |
| 2017/0108456 A1* | 4/2017 | Alizadeh | G01N 27/021 |
| 2018/0173986 A1* | 6/2018 | Gousev | G06V 40/193 |
| 2018/0268237 A1* | 9/2018 | Stanimirovic | G06V 10/143 |

FOREIGN PATENT DOCUMENTS

| | | |
|---|---|---|
| EP | 2491529 A1 | 8/2012 |
| EP | 2689393 A1 | 1/2014 |
| WO | 2014015889 A1 | 1/2014 |

OTHER PUBLICATIONS

Daisuke Iwai and Kosuke Sato, "Document Search Support by Making Physical Documents Transparent in Projection-Based Mixed Reality," Virtual Reality, Springer-Verlag London Limited, vol. 15, No. 2, pp. 147-160, 2011.

Danping Zou and Ping Tan, "CoSLAM: Collaborative visual SLAM in dynamic environments," Pattern Analysis and Machine Intelligence, IEEE Transactions on, 35(2):354-366, Feb. 2013.

International Search Report received in PCT Application No. PCT/EP2014/071032, dated Jun. 22, 2015.

Josef Sivic and Andrew Zisserman, "Video google: Efficient visual search of videos," In Jean Ponce, Martial Hebert, Cordelia Schmid, and Andrew Zisserman, editors, Toward Category-Level Object Recognition, vol. 4170 of Lecture Notes in Computer Science, pp. 127-144, Springer, 2006.

Ju Han and Bir Bhanu, "Fusion of color and infrared video for moving human detection," Pattern Recogn., 40(6): 1771-1784, Jun. 2007.

Jun Shimamura, Masashi Morimoto, and Hideki Koike, "Robust vSLAM for dynamic scenes," In MVA, pp. 344-347, 2011.

Klein, et al. "Parallel Tracking and Mapping for Small AR Workspaces," 2007 IEEE/ACM International Symposium on Mixed and Augmented Reality, pp. 225-234, 2007.

Kurz, Daniel, "Thermal touch: Thermography-enabled everywhere touch interfaces for mobile augmented reality applications," 2014 IEEE International Symposium on Mixed and Augmented Reality (ISMAR), IEEE, Sep. 10, 2014 (Sep. 10, 2014), pp. 9-16, XP032676129, DOI: 10.1109/ISMAR.2014.6948403.

Ronan Fablet, Philippe Rostaing, and Christophe Collet, "Motion segmentation and cloud tracking on noisy infrared image sequences," 1998.

Sam S. Tsai, David M. Chen, Gabriel Takacs, Vijay Chandrasekhar, Ramakrishna Vedantham, Radek Grzeszczuk, and Bernd Girod, "Fast geometric re-ranking for image-based retrieval," In ICIP, pp. 1029-1032, IEEE, 2010.

Timo Ojala and Matti Pietikainen, "Unsupervised texture segmentation using feature distributions," In Proceedings of the 9th International Conference on Image Analysis and Processing—vol. I-vol. I, ICIAP '97, pp. 311-318, London, UK, UK, 1997, Springer-Verlag.

Wei Tan, Haomin Liu, Zilong Dong, Guofeng Zhang, and Hujun Bao, "Robust monocular SLAM in dynamic environments," In Mixed and Augmented Reality (ISMAR), 2013 IEEE International Symposium on, pp. 209-218, Oct. 2013.

\* cited by examiner

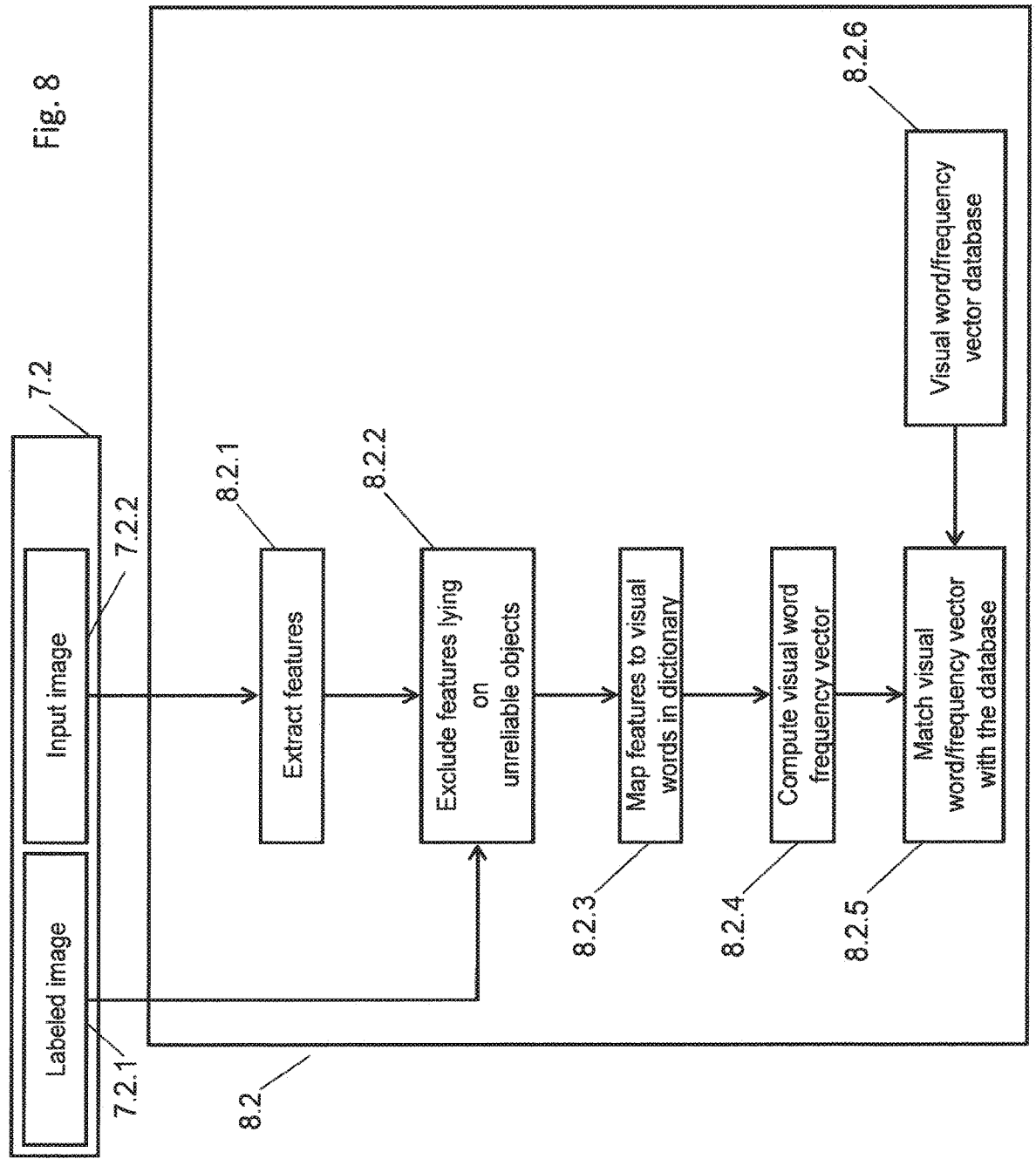

METHOD AND SYSTEM FOR DETERMINING AT LEAST ONE PROPERTY RELATED TO AT LEAST PART OF A REAL ENVIRONMENT

BACKGROUND

The present disclosure is related to a method and system for determining at least one property related to at least part of a real environment comprising receiving image information of an image of a part of a real environment captured by a camera.

Computer vision methods that involve analysis of images are often used, for example, in navigation, object recognition, 3D reconstruction, camera pose estimation, and Augmented Reality applications, to name a few. Whenever a camera pose estimation, object recognition, object tracking, Simultaneous Localization and Tracking (SLAM) or Structure-from-Motion (SfM) algorithm is used in dynamic environments where at least one real object is moving, the accuracy of the algorithm is often reduced significantly with frequent tracking failures, despite robust optimization techniques employed in the actual algorithms. This is because various such computer vision algorithms assume a static environment and that the only moving object in the scene is the camera itself, which pose may be tracked. This assumption is often broken, given that in many scenarios various moving objects could be present in the camera viewing frustum.

In such cases, accuracy of the camera pose tracking is reduced and, depending on the properties of the moving objects in the scene, tracking could become disabled (especially when the moving objects move to different directions). Furthermore visual object recognition methods may fail if the object to recognize is (partially) occluded by other objects (e.g. failure may be caused by that the visual appearance of the occluding objects is taken as an input in the object recognition method), no matter if they move or not.

In case of localization, tracking and mapping approaches, image features originating from unreliable objects are commonly dealt with by using various robust optimization techniques. For instance, camera pose optimization can be computed using the set of matches between 2D and 3D points. The derivative of pose, with regard to the re-projection error of the matches is readily available in the literature. The solution for camera pose can be computed using the least squares method, but this technique is known to be very sensitive to the influence of outliers. In order to minimize the effect of outliers, one can use iteratively re-weighted least squares, with m-estimator functions for re-projection error weighting. There are also other approaches for dealing with outliers, such as RANSAC, least median of squares etc. However, all mentioned approaches have certain limitations. E.g. m-estimators can deal with outliers, only up to a certain outlier/inlier ratio. In case of RANSAC, if there is a number of objects independently moving in the scene, there is a risk that the camera pose will not be estimated with regard to the desired object or environment, but with regard to a different object (e.g. the moving object that corresponds to an unreliable object).

There exist in the current state of the art many algorithms for detection and segmentation of dynamic (i.e. moving) objects in the scene. However, such approaches are usually computationally expensive and rely on motion segmentation and/or optical flow techniques. In general, a large number of frames is necessary to perform reliable moving object detection, using such techniques. Further, there are methods for compressing the video streams which commonly divide a scene into layers based on their depth or dynamic characteristics. E.g. see work by Adelson and Wang in reference [2]. These methods can also be used for detection and segmentation of independently moving objects in the scene. Further, there is a number of localization and mapping approaches that are crafted for deployment in dynamic environments. These approaches are often based on the Structure-from-Motion algorithm, or filter based, e.g. based on the Kalman filter or the particle filter. The downside of dynamic SLAM approaches is increased complexity and computational cost. Further, dynamic SLAM approaches usually require a large number of frames to achieve reliable segmentation of moving objects in the scene.

Das et al. in reference [3] propose a method for detecting objects based on the surface temperature profiles. The idea implies static objects observed within the environment. Reference [3] does not envision detection of independently moving objects, for which temperature profile description is given, or employment of this information for aiding either camera pose tracking or image recognition algorithms.

Adelson and Wang in [2] propose an algorithm for video compression based on segmenting image into layers with a uniform affine motion. The algorithm utilizes an optical flow algorithm for estimating pixel-wise motion. Afterwards, image segments with uniform motion are extracted utilizing the k-means algorithm.

In [6] Han and Bhanu propose a method for infrared and visible light image registration based on the human silhouette extraction and matching. It is assumed that an imaging rig consists of two stationary cameras. Initially, the image background is modeled, assuming normal distribution for each pixel in both infrared and visible light domain, which later enables simple human detection by a deviation from the modeled background.

Hyung et al. in reference [7] propose a method for 3D-feature point clustering into static and dynamic maps, and subsequent tracking of a robot's position based only on the static cluster. Feature tracking is performed based on the Joint Probabilistic data-association filter. Feature clustering is performed based on their positions and angular velocities.

Del-Blanco et al. in reference [4] propose a target detection and ego-motion estimation using the forward looking infrared imagery (FLIR), with the emphasis on airborne applications. Initially, edges are extracted from FLIR images using the Canny algorithm. Then, forward-backward tracking of extracted edges is performed to extract reliable image features and their frame-to-frame displacements. Ego-motion, i.e. camera motion, is computed using RANSAC and Least Median of Squares algorithm with a restrictive affine motion model. Once the camera motion is computed, a determined set of outliers is further clustered into separate targets based on the feature connectivity.

Fablet et al. in reference [5] propose a cloud segmentation algorithm in infrared images. An affine motion model is estimated using a modified optical flow equation optimized via IRLS with m-estimators. Actual segmentation is achieved using Markov Random Field modeling.

Tan et al. in reference [12] propose a modified PTAM (see reference [8]) approach for handling moving objects in the scene. Occluded points are detected using a heuristic algorithm that takes into account change in the feature appearance and geometric relation to the neighboring feature points. Points that are not found at their expected position and are not occluded are assumed to be outliers and are excluded from further localization and mapping. Further, the authors propose a bin-based sampling and sample evaluation for RANSAC, where the bin fidelity is estimated based on the inlier/outlier ratio. This approach for exclusion of image features corresponding to moving objects is custom built only for PTAM based tracking and mapping algorithms.

A similar method is proposed by Shimamura et al. in [10]. In a freely moving camera scenario, outliers are detected by a robust pose optimization algorithm. Once the outliers are extracted, they are filtered to exclude outliers originating from repetitive textures, or a lack of texture. Afterwards, optical flow vectors of outliers are clustered using the expectation-maximization algorithm (EM) for parameter fitting of a Gaussian mixture model. The first problem with this approach is that it assumes that the number of outliers, i.e. points belonging to a moving object is lower than the number of inliers. Further, the number of moving objects in the scene has to be known in order to initialize the EM algorithm.

Zou and Tan in reference [14] propose a collaborative approach to SLAM in dynamic environments by assuming a number of freely moving cameras. Pose estimation is performed by simultaneously optimizing poses for all cameras and 3D coordinates of dynamic points. In this manner, the poses of the cameras, which are observing largely dynamic parts of the scene, can be optimized with regard to the cameras which are observing mostly static parts of the scene.

SUMMARY

It would be desirable to provide a method and system for determining at least one property related to at least part of a real environment that effectively improve robustness and accuracy of computer vision algorithms.

According to a first aspect, there is disclosed a method for determining at least one property related to at least part of a real environment, comprising receiving image information of a first image of a first part of a real environment captured by a first camera, wherein the first camera is a thermal camera and the first image is a thermal image, wherein the first part of the real environment is a first environment part, providing at least one description related to at least one class of real objects, wherein the at least one description includes at least one thermal property related to the at least one class of real objects, receiving image information of a second image of the first environment part and of a second part of the real environment captured by a second camera, wherein the second part of the real environment is a second environment part, providing an image alignment between the first image and the second image, determining, for at least one second image region contained in the second image, at least one second probability according to the image alignment, pixel information of the first image, and the at least one description, wherein the at least one second probability relates to the at least one class of real objects, and wherein the at least one second image region comprises at least part of the first environment part, determining at least one image feature derived from pixel information of at least one third image region contained in the second image according to the at least one second probability, wherein the at least one third image region comprises at least part of the second environment part, and performing at least one computer vision method to determine at least one property related to at least part of the second environment part according to the determined at least one image feature.

According to a second aspect, there is disclosed a method for determining at least one property related to at least part of a real environment, comprising receiving image information of a first image of a first part of a real environment captured by a first camera, wherein the first camera is a thermal camera and the first image is a thermal image, wherein the first part of the real environment is a first environment part, providing at least one description related to at least one class of real objects, wherein the at least one description includes at least one thermal property related to the at least one class of real objects, receiving image information of a second image of the first environment part and of a second part of the real environment captured by a second camera, wherein the second part of the real environment is a second environment part, providing an image alignment between the first image and the second image, determining, for at least one first image region contained in the first image, at least one first probability according to pixel information of the first image and the at least one description, wherein the at least one first probability relates to the at least one class of real objects, wherein the at least one first image region comprises at least part of the first environment part, providing one or more image features extracted or derived from at least part of the second image, wherein the one or more image features have respective second positions in a coordinate system of the second image, determining respective first positions in a coordinate system of the first image corresponding to a respective one of the second positions according to the image alignment, assigning to each of the one or more image features at least one feature probability according to the corresponding first position and the at least one first probability, determining at least one image feature among the one or more image features according to the at least one feature probability associated with each of the one or more image features, and performing at least one computer vision method to determine at least one property related to at least part of the second environment part according to the determined at least one image feature.

According to another aspect, there is disclosed a respective system for determining at least one property related to at least part of a real environment comprising a processing system which is configured to perform at least one of the methods as described above, and embodiments thereof as described further herein below.

Particularly, according to the present invention, there is disclosed that thermal properties of real objects in the scene could be used in order to improve robustness and accuracy of computer vision algorithms (e.g. vision based object tracking and recognition). Given the assumption that thermal properties of classes of unreliable objects, e.g. potentially moving or occluding objects as in the previous examples, are known and can be described, a thermal imaging device could be utilized to detect regions in the thermal image to which the description of at least one class of unreliable objects applies. The corresponding pixels in the thermal image or any other camera image can then be excluded from processing by a subsequent computer vision algorithm.

Particularly, the present invention proposes that unreliable object detection, segmentation and exclusion from the input of the computer vision methods could be based on known thermal properties of one or more objects. Further, when objects are detected in the scene using their thermal properties from a thermal image, it is possible to exclude them even when they are temporarily static in the scene.

One of the inventors' ideas is that one or more classes of unreliable objects for a particular computer vision task may be defined, and thus thermal properties corresponding to the class(es) could be known and employed in the particular computer vision task. For example, the particular computer vision task may be to reconstruct buildings based on camera RGB images, and thus human beings captured in the camera RGB images (e.g. image features of the human beings detected in the RGB images) may have to be excluded from the vision based reconstruction process. The thermal property of human and thermal images of the same scene as captured in the RGB images could be provided for the exclusion of the image features of the human beings.

None of the above mentioned prior art discloses that unreliable objects could be excluded from a computer vision algorithm according to the thermal properties of the unreliable objects and pixel information of a thermal image of the unreliable objects. Further, in the field of object tracking, recognition and/or reconstruction based on image features detected in images of a target object, none of this prior art proposes using thermal properties of objects in order to exclude image features associated with other objects (called unreliable objects) from tracking, recognition, and/or reconstruction of the target object.

There are no approaches known in the art that attempt to solve the problem of unreliable object detection and segmentation, given known thermal properties of the unreliable object, using the thermal infrared spectrum, with the goal of excluding corresponding image regions from computer vision algorithms. With regard to the present invention, unreliable objects may be grouped in classes of objects which are deemed undesirable for the specific computer vision algorithm. E.g. in case of SLAM algorithms that are designed for a static environment, any potentially moving objects in the environment are deemed undesirable, i.e. unreliable.

With respect to the prior art, the present invention provides the following differences and advantages: regarding the approach as disclosed in reference [6], a difference with regard to the present invention is that the cameras in [6] are assumed to be stationary, and the knowledge of segmented regions in the images is used for neither camera pose tracking, nor for image recognition tasks. With respect to the approach as disclosed in reference [7], the difference to the present invention is that the method does not utilize temperature of the image features for thermal properties of potentially moving object for the purpose of their detection, segmentation and exclusion from the map of the environment. Compared to the approach as disclosed in [4], the present invention does image feature detection and exclusion based on the thermal properties of the objects, and not on the frame-to-frame displacements of infrared edge-based features. The approach in [5] does not attempt to exclude image features from the tracking algorithm or the image recognition algorithm, but instead attempts to associate affine motion model and perform motion segmentation.

The present invention proposes deployment of a thermal imaging device for determining regions in a camera image to which a description of at least one class of unreliable objects applies, wherein the description is based on thermal properties, and it proposes the exclusion of the determined regions from the input of a computer vision algorithm.

Main differences between existing approaches and the present invention are the following: According to embodiments of the present invention, only one thermal image is used to segment objects which satisfy known thermal properties, and thus, a decision on exclusion of these objects can be done instantly, based on only one image. In other embodiments, segmentation of such objects can be performed from a number of images using various segmentation techniques, that are partially or fully relying on known thermal properties of unreliable objects. On the other hand, video compression algorithms commonly require computation of the optical flow in order to segment the image, which is a computationally expensive operation. As implied, the present invention would enable detection and exclusion of classes of unreliable objects which are temporarily, or constantly, static.

Compared to localization and mapping approaches for dynamic scenes, the present invention provides a novel approach for excluding objects based on their thermal properties. Moreover, it can provide additional robustness to any computer vision algorithm, for which exclusion of classes of unreliable objects is desired, utilizing a relatively simple pre-processing algorithm. Therefore, an adaptation of tracking, localization and mapping algorithms for usage in dynamic scenes, containing independently moving or occluding objects with known thermal properties, can be achieved by an addition of a novel image pre-processing algorithm block, based on the present invention.

In case of classification, detection and recognition algorithms for objects, images and/or scenes, unreliable objects may be considered to be any objects that originally do not belong to observed objects, images or scenes. For instance, these objects could be any occluding objects with regard to the object of interest and camera viewpoint. Similarly, detection and segmentation of unreliable objects can be achieved utilizing known thermal properties of the unreliable object classes, and given available registered thermal images of the observed scene. In general, standard approaches do not take into consideration potentially occluding objects.

The following embodiments are particularly applicable with respect to the first aspect, but may also be applied with respect to the second aspect as appropriate.

According to an embodiment, the method further comprises determining, for at least one first image region contained in the first image, at least one first probability relating to the at least one class of real objects according to the at least one description and pixel information of the first image, wherein the at least one first image region comprises at least part of the first environment part, mapping the at least one first image region from the first image to the second image according to the image alignment, determining the at least one second image region according to the mapping result, wherein at least part of the at least one second probability is determined according to the at least one first probability and the mapping result.

According to an embodiment, the method further comprises segmenting the first image according to the at least one description and the pixel information of the first image, wherein the at least one first image region and/or the at least one first probability are determined according to the segmenting of the first image.

According to an embodiment, the method further comprises mapping pixel information of the first image from first image coordinates to second image coordinates according to the image alignment, and segmenting the second image according to the mapped pixel information of the first image and the at least one description, wherein the at least one second image region and/or the at least one second probability are determined according to the segmenting of the second image.

According to an embodiment, the method further comprises providing additional information derived from at least one additional image of at least part of the real environment captured by at least one additional camera different from the first camera, wherein the at least one additional image comprises at least part of the first environment part, wherein the at least one second image region and/or the at least one second probability are determined further according to the additional information.

For example, the at least one additional image comprises the second image.

According to an embodiment, the additional information includes at least one of depth information, light-field information, color information, gradient information, distinctive image features, classified distinctive image features, texture information, optical flow information, local or global image histograms, distinctive image feature histograms, visual words histograms, segmented image regions.

According to an embodiment, the step of determining the at least one image feature comprises providing a plurality of image features extracted in the second image, and selecting the at least one image feature from the plurality of image features, wherein at least part of the respective third image region does not overlap with the at least one second image region, or providing, for the plurality of image features, positions in the second image and selecting the at least one image feature from the plurality of image features, wherein the position of the selected at least one image feature is not in the at least one second image region.

Preferably, the step of determining the at least one image feature comprises extracting the at least one image feature from at least part of the second image, wherein the at least part of the second image does not include at least part of the at least one second image region.

For example, the at least one second probability is binary.

According to an embodiment, the method further comprises assigning at least one feature probability to the at least one image feature according to the at least one second probability.

Particularly, the step of assigning at least one feature probability to the at least one image feature comprises determining at least one position of the at least one image feature in the second image, and determining at least one feature probability according to the at least one second probability related to the at least one second image region and a spatial relationship between the at least one position of the at least one image feature and the at least one second image region, or determining at least one feature probability according to the at least one second probability related to the at least one second image region and a spatial relationship between the at least one third image region and the at least one second image region.

The following embodiments are particularly applicable with respect to the second aspect, but may also be applied with respect to the first aspect as appropriate.

According to an embodiment, the at least one first probability is binary and the at least one feature probability is binary.

Preferably, the step of determining the at least one image feature comprises providing at least one threshold and determining the at least one image feature among the plurality of image features by comparing the at least one feature probability associated with each of the plurality of image features and the at least one threshold.

The following embodiments are particularly applicable with respect to the first and second aspects as disclosed herein.

According to an embodiment, the computer vision method is performed according to the at least one image feature and the assigned at least one feature probability.

For example, the step of performing the at least one computer vision method comprises matching the at least one image feature with at least one reference feature, determining at least one error between the at least one image feature and the matched at least one reference feature, and weighting the at least one error according to the assigned at least one feature probability.

For instance, the at least one error comprises at least one of 2D image reprojection error and 3D Euclidean distance.

According to an embodiment, the step of performing at least one computer vision method includes at least one of:
  determining a position of the second camera relative to the at least part of the second environment part, wherein the at least one property is the position of the second camera,
  recognizing or classifying the at least part of the second environment part, wherein the at least one property is an identity or a class,
  determining 3D geometrical information related to the at least part of the second environment part, wherein the at least one property is the determined 3D geometrical information.

According to an embodiment, the description further includes at least one of spatial properties, visual properties, and indications of input data.

According to an embodiment, the at least one thermal property represents temperature.

According to an embodiment, the at least one property is related to at least part of the second environment part and includes at least one of an identity or a class, a position in a 3D space relative to a camera coordinate system, and 3D geometrical information defined in a camera coordinate system.

According to an embodiment, the at least one image feature includes at least one of image patches, points of interest, edges of interest, high level image descriptors, distinctive image features, visual words, and image feature histograms.

According to another aspect, the invention is also related to a computer program product comprising software code sections which are adapted to perform a method according to the invention as disclosed herein. Particularly, the software code sections are contained on a computer readable medium which is non-transitory. The software code sections may be loaded into the memory of one or more processing devices (such as microprocessors) as described herein. Any used processing devices may communicate via a communication network, e.g. via a server computer or a point to point communication, as described herein.

For example, the processing system according to the invention is comprised, at least in part, in a mobile device (such as a mobile phone, wearable computer, tablet computer, mobile computer, often called laptop, or a head mounted display, such as used for optical see-through augmented reality applications) and/or in a server computer adapted to communicate with the mobile device and/or in a personal computer (e.g. a desktop computer or a laptop computer). The processing system may be comprised in only one of these devices, e.g. in the mobile device or in the server computer, or may be a distributed system in which one or more processing tasks are distributed and processed by one or more processing devices which are distributed and are communicating with each other, e.g. by point to point communication or via a network.

Any steps, embodiments, aspects and examples described herein with respect to a method can equally and analogously be implemented by a respective system comprising a processing system being configured (by software and/or hardware) to perform the respective steps, embodiments, aspects or examples. Any processing device used within the processing system may be configured as such and communicate via a communication network, e.g. via a server computer or a point to point communication, with one or more cameras, displays and/or any other components.

DESCRIPTION OF THE DRAWINGS

Aspects and embodiments of the invention will now be described with respect to the drawings, in which:

FIG. 8 shows another embodiment of a computer vision algorithm using a set of labelled input images as input.

DETAILED DESCRIPTION

Figure 1:
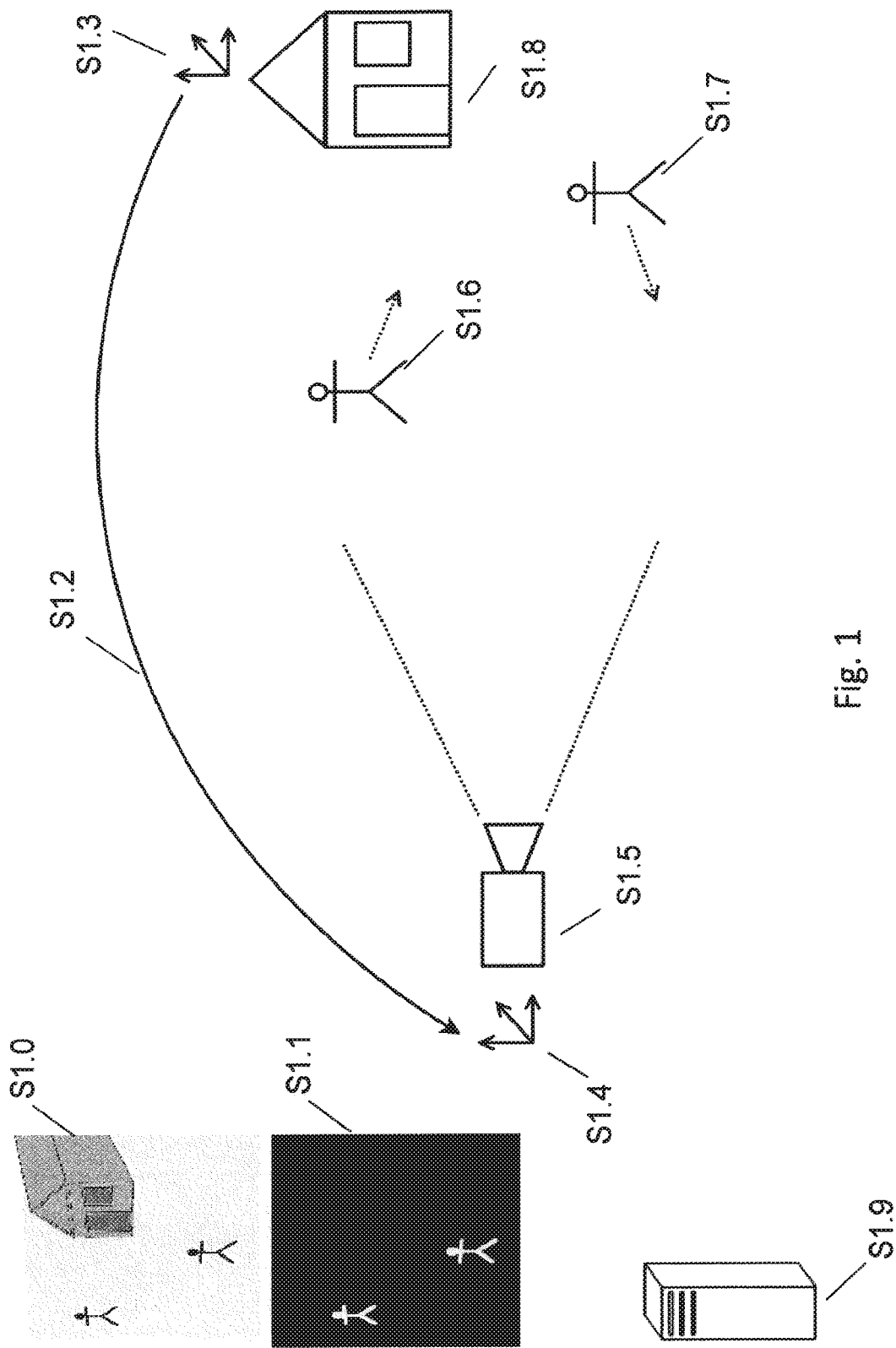
FIG. 1 shows a schematic system setup according to an embodiment of the present invention.

FIG. 1 shows a possible system setup according to an embodiment of the present invention. A thermal camera S1.5 observes a real environment S1.8 including a house (i.e. a second part of the real environment). The camera S1.5 can be either static or moving with regard to the environment S1.8, and the thermal images captured by the camera may be used for computer vision algorithms (e.g. localization, tracking and mapping), as well as for unreliable object detection and segmentation. In this embodiment, a computer vision algorithm is stored in the memory of a processing device, such as a microcomputer S1.9, or of another processing device, and executed. One of the goals of the algorithm is to determine the transformation S1.2 between the camera coordinate system S1.4 of the thermal camera S1.5 and the environment coordinate system S1.3. Potentially moving objects, such as humans S1.6 (i.e. a first part of the real environment) and S1.7, are deemed unreliable, and image regions in the image S1.0 captured by the thermal camera S1.5 corresponding to these objects should be removed from the input of the computer vision algorithm. Given known thermal properties of the class of humans to which humans S1.6 and S1.7 belong, and the thermal image S1.0, a segmented image S1.1 is produced by a dedicated computer algorithm stored and executed in the processing device S1.9 or another processing device. In the segmented image S1.1, white regions indicate parts of unreliable objects, which should be excluded from the computer vision algorithm (e.g. localization, tracking, or mapping). The thermal properties of the class of human bodies to which humans S1.6 and S1.7 belong, can be given as a temperature range indicating human body temperature, e.g. a range between 35-38° Celsius. Thus, the detection and segmentation of the humans S1.6 and S1.7 in the thermal image S1.0 can be based on simple thermal image thresholding.

Alternatively, an algorithm for detection and segmentation of image regions corresponding to unreliable object classes can be performed using a dedicated processing device, with final results in form of image(s) S1.1 transmitted to the processing device S1.9 via a pre-defined communication protocol.

In another embodiment of the present invention, one or more additional cameras are used in the previously described system depicted in FIG. 1, and the images of these are used as an input to computer vision algorithms. Additional cameras can capture, but are not limited to, any of the following imaging modalities: visible light (e.g. RGB cameras), RGB and depth, depth, light-field, infrared etc. In this embodiment, additionally an alignment between the thermal camera S1.5 and at least one of the additional cameras, or an alignment between the thermal image S1.0 and at least one image captured by the additional camera(s) (i.e. the one or more additional cameras, which are not thermal) is provided. Thereby it is assumed that an image region location can be transferred from any thermal image coordinate system to any coordinate system of non-thermal images captured by the one or more additional cameras or vice versa. It is further optionally assumed that relative timestamps, i.e. moments of capture are known for images captured from the available cameras, so that for each image originating from a camera, an image from any other camera with the closest capturing time can be determined. In this way, unreliable objects detected and segmented in thermal images, and corresponding image regions, can be transferred directly to the image coordinates of at least one of non-thermal images, i.e. images originating from additional cameras, used for tracking, localization and mapping. Finally, image regions, corresponding to the unreliable objects, in the at least one non-thermal image can be removed from the input of tracking, localization, or mapping algorithms.

In case when there are multiple cameras observing the scene, an alignment for transferring image regions from an image coordinate system of one of the cameras to a coordinate system of another camera is determined. In an embodiment, it is assumed that intrinsic parameters of the cameras are obtained previously via any camera calibration algorithm present in the state of the art. Given camera intrinsic parameters (such as focal length, principal point, skew, and distortion parameters), a possible way of transferring image regions from an image coordinate system to the other is to compute the fundamental matrix. Fundamental matrix is usually obtained using point-based correspondences, and it is a straightforward procedure for cameras of the same imaging modality that are observing the scene. However, a fundamental matrix does not provide means for directly transferring an image region between coordinate systems of cameras. Instead, for each point in a camera, a fundamental matrix defines an epipolar line on which the corresponding point lies in the image coordinate system of another camera. When points, or regions surrounding them, are distinctive enough, a matching point on the epipolar line can be found using any of similarity measures available in the state of the art, e.g. sum of squared differences, zero-normalized cross correlation, gradient orientation histograms etc. However, when one of the cameras is capturing thermal infrared spectrum and the other one is capturing a visible light spectrum, determining point-based correspondences can be difficult, given differences in appearance of objects in thermal infrared and visible light spectrum. This problem can be solved by using geometric features, such as edges, and matching them between thermal and visible light images. Edges are useful in this sense, because separate objects in the scene usually have at least slightly different temperature, and thus their silhouettes are discernible in a thermal image. On the other hand, separate objects usually have a different appearance in the visible light images, as well. In both cases, edges can be used to delineate objects in the scene. In this manner, borders, i.e. edges, of segmented objects in an image coordinate system can be transferred to another image coordinate system. When this is not possible, position can be spatially interpolated with regard to the closest edges/points for which it was possible to determine the correspondence between images. Another embodiment uses a homography, which is a 3×3 matrix, to describe the alignment of images from different cameras. Multiplying a pixel position in homogenous coordinates from an image with this homography matrix results in the corresponding pixel position in the second image. The inverse transformation can be obtained by inverting the matrix.

According to another embodiment, unreliable object detection and segmentation 6.0 is not performed prior to the execution of the computer vision algorithm 8.0. Instead, belongingness of an image region to a class of unreliable objects is evaluated only for image regions which are selected as regions of interest for computer vision algorithm 8.0. Let us assume that the computer vision algorithm 8.0 is a camera pose estimation algorithm based on distinctive image features (e.g. SIFT, SURF) that takes as an input a stream of visible light images. Further, let us assume that unreliable object class descriptions are given in form of temperature ranges, i.e. all pixels between defined minimal and maximal temperatures are considered to belong to an object of the respective unreliable object class, while all pixels with temperatures that fall outside of the given range are considered not to belong to an object of the respective unreliable object class. Therefore, the probability of pixel belongingness to an object of the unreliable object class is a simple binary function that can be queried on demand for any pixel in the thermal image, assuming that the thermal image has associated temperatures for its pixels. Further, each distinctive image feature in the visible light image is computed according to pixel intensities of a subset of the visible light image pixels. Therefore, the pose estimation algorithm needs to check the belongingness of image pixels in the visible light image to an object of the unreliable object class, only for pixels in image regions from which distinctive image features are to be computed. The belongingness for a pixel in the visible light image can be checked by transforming its position to the thermal image, utilizing known alignment, and checking the temperature of a pixel with regard to the temperature ranges contained in the unreliable object class description. In this manner, the computational expense of detection and segmentation of unreliable objects is reduced. The benefit of the pose estimation algorithm is that distinctive image features, that are determined to lie in image regions corresponding to unreliable objects, can be excluded from further processing, e.g. feature matching and pose optimization.

In another variant of the previous embodiment, camera pose is computed based on the image displacements of distinctive image features. Each image feature has a single associated probability value (indicating a probability of the image feature and/or relevant pixels belonging to an unreliable object of an unreliable object class defined by its respective description). Camera pose parameters (translation and rotation with regard to the pre-defined coordinate system) are computed utilizing the image feature displacements and the normal equations encoding derivative of the image feature displacement with regard to the camera pose parameters. Normal equations can be solved using non-iterative methods (e.g. Cholesky decomposition or QR factorization) or iterative methods (e.g. iteratively reweighted least squares algorithms). Each distinctive image feature yields one or two normal equations, depending on the formulation of the problem, which stacked together form a system of normal equations to be solved. In the general case each normal equation has the same contribution to the system solution. However, normal equations can be weighted to increase the influence of image features that are determined to be reliable, and to decrease the influence of the outliers. For example, this can be achieved by deployment of m-estimators in an iteratively reweighted least squares algorithm. According to this embodiment, given computed probability of belongingness to an unreliable object for an image feature, weighting of respective normal equations can be performed according to this probability. In this manner, normal equations from image features that are determined to belong to unreliable objects with a high probability would be given lower weight, and normal equations from image features that are determined to belong to unreliable objects with a low probability would be given higher weight.

In another embodiment, distinctive image features can be labelled as parts of unreliable objects if the pixels (from which the respective distinctive image feature is derived) lying in the image region are evaluated as part of unreliable objects, or if any of the pixels lying in the image feature region are evaluated as part of unreliable objects, or if a 2D Euclidean distance in the image, between any of the pixels in the image feature region and any of the pixels evaluated as part of unreliable objects, is lower than a predefined threshold.

Figure 2:
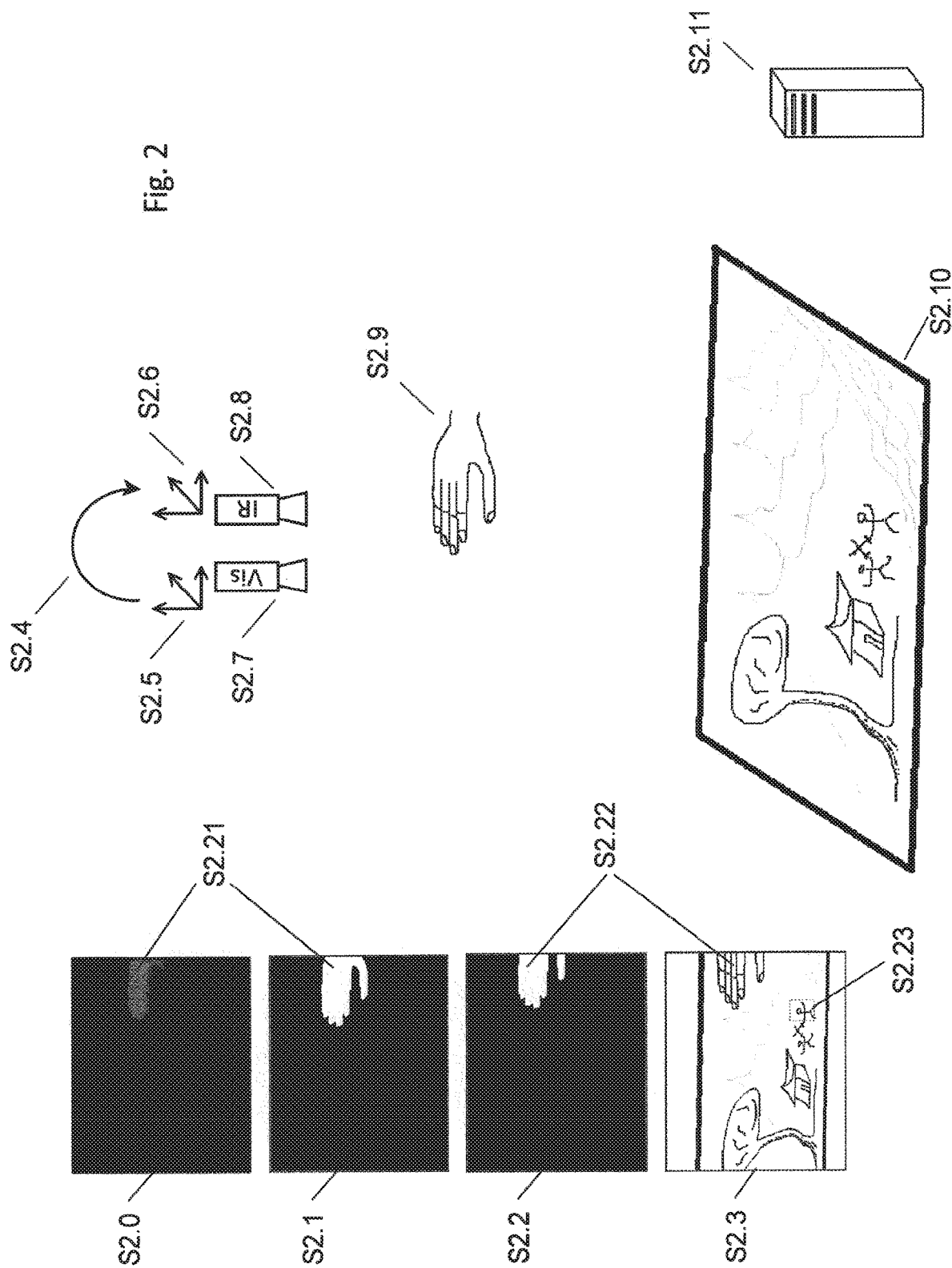
FIG. 2 shows a schematic system setup according to another embodiment of the present invention.

FIG. 2 depicts a possible system setup according to another embodiment of the present invention. In this case, an image recognition algorithm is stored in the memory of a processing device S2.11, such as a microcomputer, and executed. The image recognition algorithm receives information of an image as an input and determines a corresponding image in the database, which is also stored in the memory of the processing device S2.11. In a possible implementation, the database can be stored in another processing device, or an array of processing devices which communicate with the processing device S2.11 using a pre-defined server-client protocol. In another implementation, the database may be located in the processing device S2.11. The processing device S2.11 can be a stand-alone device, as shown in the FIG. 2 (e.g. contained in or forming a server computer), and may communicate with the cameras S2.7 and S2.8 via cable or wirelessly. The processing device S2.11, the thermal camera S2.8 and the visible light camera S2.7 can be incorporated in the same device, like a laptop or a mobile phone, or may be a distributed system. They may comprise a respective processing device, such as a microprocessor, for performing one or more tasks, and may form together or individually a processing system according to aspects of the invention.

In the embodiment shown in FIG. 2, the thermal camera S2.8 (i.e. a first camera) is observing the real environment, in which the real hand S2.9 (i.e. a first part of the real environment) and the real object (i.e. a printout of a picture in this example) S2.10 (i.e. a second part of the real environment) are located. A thermal image S2.0 (i.e. a first image) of the real environment is captured by the thermal camera S2.8. The visible light camera S2.7 (i.e. a second camera) captures images that are used as an input of the image recognition algorithm. For example, the image S2.3 (i.e. a second image) of the picture (printout) S2.10 and the real hand S2.9 captured by the camera S2.7 may be used as an input of the image recognition algorithm.

The alignment S2.4 between the camera coordinate system S2.6 of the camera S2.8 and the camera coordinate system S2.5 of the camera S2.7 may be known. The alignment S2.4 may be represented as a rigid body transformation, a homography, a look-up table, a fundamental matrix or an essential matrix.

The alignment S2.4 enables the transfer of image regions from an image to another. The hand S2.9 occludes a part of the picture S2.10 with respect to the visible light camera S2.7 and the thermal camera S.2.8.

The occluding object S2.9, which thermal properties are known, is occluding parts of the object target S2.10. In this case the object target S2.10 is a printout of a 2D image present in the environment, for which a corresponding image in the database is to be determined. However, an object target can be any 3D object, or an observed scene itself. In such cases, a corresponding database of objects and/or scenes is assumed to be available.

The hand S2.9 would be an unreliable object for the image recognition algorithm that uses the image S2.3 as an input.

The image region S2.21 (i.e. at least one first image region) contained in the thermal image S2.0 comprises at least part of the real hand S2.9.

Descriptions of classes of unreliable objects are provided to the algorithm. The description of an unreliable object class is fully or partially based on thermal properties of objects belonging to such class. Using the provided unreliable object class description of the unreliable object 2.9 (e.g. a class describing human skin), a segmented infrared image S2.1 is produced for example based on segmentation, in which image regions depicted in white correspond to the detected and segmented unreliable object S2.9. Knowing the alignment S2.4, the image S2.2 is produced, which represents a segmented image region of the unreliable object S2.9, in image coordinates of the image S2.3 captured by the visible light camera S2.7. The white part in the image S2.2 is a mask, which could represent an image region S2.22 (i.e. at least one second image region) in the image S2.3. The image region S2.22 comprises at least part of the real hand S2.9.

Finally, image features extracted from the visible light image S2.3, lying in a region corresponding to the white region of the image S2.2, may not be used by the image recognition algorithm for looking for a reference (i.e. a corresponding) image in the database, with regard to the currently captured image S2.3, by the camera S2.7.

Image features derived from pixel information outside of the region S2.22 in the image S2.3 may be used by a vision based recognition method to determine an identity for the picture S2.10. For example, an image feature (e.g. SIFT feature) may be derived from an image region S2.23 (i.e. at least one third image region) contained in the image S2.3. The image region S2.23 comprises at least part of the picture S2.10.

According to another embodiment, the probability of belongingness to the unreliable object class (here: human skin class) can be computed for multiple pixels in the thermal image, based on the description of the unreliable object class, thermal image pixel values and optionally visible light image pixel values. The image recognition algorithm based on distinctive image features takes advantage of the computed probabilities as follows. Instead of excluding all the image features that lie either fully or partially in the regions S2.22, i.e. regions S2.21, the probability for each image feature is computed according to the probabilities of belongingness to the unreliable object class of pixels comprising the respective image region used for the computation of the image feature. Further, the image feature can then be used to weight the influence of each separate distinctive image feature on the final result of the image recognition algorithm (e.g. weight the influence of each separate feature in the computation of the histogram of distinctive image features or visual words histograms). This is particularly useful for image features lying close to the pixels delineating unreliable objects in the image. For example, all image features lying close to the pixels delineating a human hand in the image could still be included to the image recognition pipeline, but their influence on the recognition result could be weighted lower due to possible reduced quality given their proximity to the unreliable object.

In another embodiment, camera S2.7 can be of a different imaging modality, such as, but not limited to, any of the following imaging modalities: RGB Depth, depth, lightfield, infrared etc. In such case, alignment S2.4 for transferring image regions between camera coordinate systems has to be adapted as well.

According to another embodiment of the present invention, detection and segmentation of unreliable objects is used to increase robustness of the image recognition algorithm, where image recognition is based on the image color or grayscale values histogram. In this embodiment it is assumed that the system comprises a thermal camera and a visible light camera. It is further assumed that alignment between these two cameras is known (thus the alignment between two images captured by the two cameras is known). Further, given a description of unreliable object classes, it is possible to determine probabilities for separate pixels in the thermal image indicative of their belongingness to unreliable objects. Using known alignment between thermal and visible light images, these probabilities can be mapped to pixels in a visible light image. In general, a grayscale value image histogram has a number of bins equal to the range of grayscale values, where each bin encodes the number of pixels with a specific grayscale value associated to the respective bin. In this case, each pixel in the image has equal contribution to the histogram. In this embodiment, we present an alternative to this method, where given pixel intensity values and computed probabilities, each pixel contributes to the histogram bin according to its associated probability. E.g. a pixel which has a high probability of belonging to an unreliable object is weighted with lower coefficient, and a pixel which has a low probability of belonging to an unreliable object is weighted with higher coefficient. In this manner, the histogram is more influenced by the pixels having low probability of belonging to unreliable objects, making it better suited for comparison with histograms of reference images, and thus increasing the overall quality of the image recognition algorithm.

Analogous to the previous embodiment, a similar principle can be used when image recognition or object detection algorithms rely on histograms of distinctive image features and/or descriptors such as SIFT or gravity-aligned visual feature descriptors, see references [16, 17, 18], e.g. bag of visual words algorithms (references [11], [1]). The contribution of each separate distinctive image feature to the histogram of visual words can be weighted according to the associated probability of feature image region belongingness to unreliable objects, as defined by descriptions of unreliable object classes.

Figure 3:
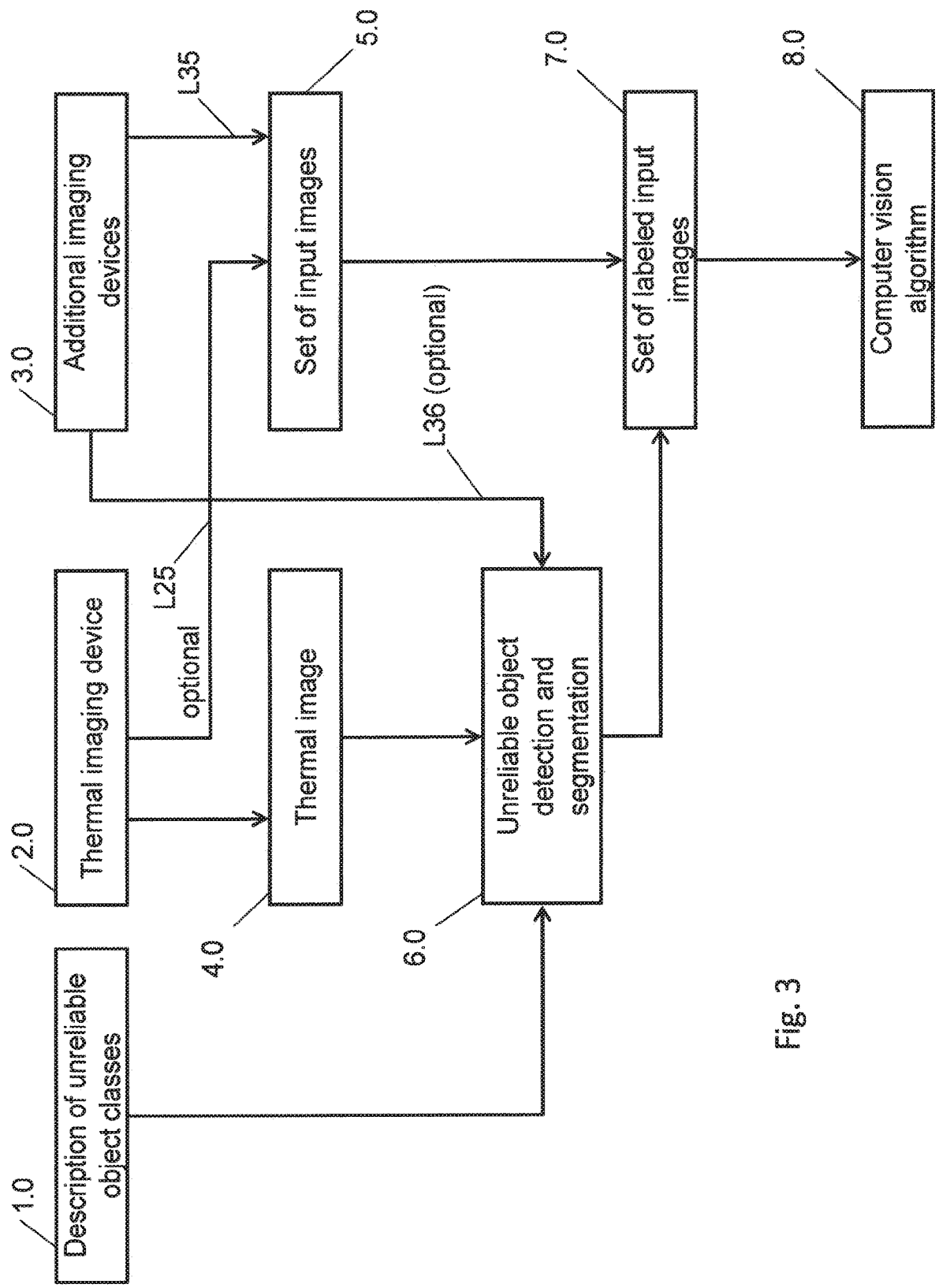
FIG. 3 depicts a diagram of elements comprised in one or more embodiments of the present invention.

FIG. 3 depicts a diagram of elements according to an embodiment of the present invention. Block 1.0 represents at least one description of at least one class of unreliable objects; 2.0 represents a thermal imaging device (e.g. a thermal camera); 3.0 is an optional element that denotes one or more additional imaging devices, e.g. of possibly different modalities (e.g. thermal camera, RGB camera, depth camera, X-ray imaging camera); 4.0 represents an input thermal image with temperatures encoded as pixel intensities; 5.0 represents a set of input images to the computer vision algorithm 8.0. The set of input images (5.0) comprises, for instance, one or more images of different modalities. Block 6.0 performs an unreliable object detection and segmentation based on given inputs. The given input includes the thermal image 4.0 and the description of unreliable object classes 1.0, and optionally includes images captured by additional imaging devices 3.0. Block 7.0 represents a set of labelled input images, which is created by labelling segmented unreliable objects (6.0), in the set of input images denoted in block 5.0. The labels thereby are indicative of at least one probability that at least one pixel or image region belongs to the at least one class of unreliable objects according to the at least one description of at least one class of unreliable objects. Finally, a computer vision algorithm, denoted in block 8.0, takes a set of labelled input images 7.0 (described in the following) as an input for further processing.

The at least one description of unreliable objects classes 1.0 is indicative of at least one thermal property related to the at least one class of unreliable objects. The at least one thermal property particularly represents the intrinsic natural unreliable object class spatial and temporal thermal characteristics (e.g. average human body temperature is an intrinsic thermal characteristic of the class of human beings). The at least one description of unreliable object classes maps from at least one temperature (e.g. pixel information in the thermal image) to at least one probability. The at least one probability could for example indicate the at least one probability of at least one corresponding pixel or image region of the thermal image belonging to the at least one class of unreliable objects. In some examples or embodiments disclosed herein, the at least one probability is binary and thus at least one image region may be labelled as either unreliable objects or reliable objects.

Further, the present invention also envisions descriptions of object classes which combine thermal properties with properties computed from additional imaging modalities 3.0. Thus, an (optional) link according to arrow L36 can be present in the method. The link according to arrow L36 indicates that one or more images from imaging devices 3.0 are provided to the block 6.0. Description of an unreliable object class could be achieved by one of the following methods or combinations thereof: fixed temperature ranges; single- or multi-variable probability density functions describing thermal properties of the object class; probability density functions describing thermal properties, spatial properties and/or different image features originating from additional imaging modalities; Fourier transform coefficients; wavelet transform coefficients; features originating from other single- or multi-variable frequency analysis methods. Further, classes of unreliable objects can be described via classifiers, which are obtained by, but not limited to, one of following algorithms or combinations thereof: k nearest neighbor (kNN), support vector machines (SVM), Bayesian approaches, neural networks, deep belief networks, approaches based on decision trees, genetic algorithms, Markov processes, bootstrapping.

The thermal imaging device 2.0 captures the thermal image 4.0, which contains temperature or encoded temperature for each pixel. The thermal imaging device 2.0 can be based on thermal long wave infrared imaging, or other available techniques. The thermal image 4.0 may represent an array of pixels, where each pixel encodes an integer or a real value, which is indicative of the temperature of the part of the captured scene. The pixel value can be mapped using a known mapping function (e.g. the mapping function provided by the thermal camera manufacturer) to a real value of the temperature in degrees Celsius, Kelvin or Fahrenheit.

The presence of additional imaging devices 3.0 is optional in the embodiment shown in FIG. 3. The additional imaging devices 3.0 may be used when image modalities, originating from such devices, are used by the unreliable object class description 1.0, detection and segmentation 6.0 and/or targeted computer vision algorithm 8.0.

The additional imaging devices 3.0 may include, but are not limited to, the following devices: infrared cameras, electro-optical cameras capturing visible light, depth cameras, time-of-flight cameras, RGBDepth cameras, light field cameras, microscopes, X-Ray imaging systems and magnetic resonance imaging systems.

It is optionally assumed that used imaging devices (including the thermal imaging device and the additional imaging devices) are registered mutually, i.e. intrinsic parameters of the imaging devices are known, as well as their spatial orientations with regard to each other. Their spatial orientations are used to determine an image alignment between the thermal image 4.0 captured by the thermal imaging device 2.0 and one of images captured by the additional imaging devices 3.0. It is also possible to directly compute the image alignment without the spatial orientations between the imaging devices. For example, image based matching or registration (based on pixel information or landmarks) may be used to compute such image alignment.

More specifically, it is assumed that it is possible to transfer image regions between image coordinate systems of available cameras in the system. Moreover, it may be assumed that relative timestamps, i.e. moments of capture, are known for available image capturing devices (2.0 and 3.0), so that images can be temporally aligned. The imaging devices (2.0 and 3.0) could be either static (i.e. a fixed spatial relationship between the imaging devices, and/or at least one of the imaging devices has a fixed spatial relationship with at least part of the real environment) or dynamic (i.e. moving with respect to each other and/or moving with respect to at least part of the real environment). In case one or more imaging devices are dynamic, it is assumed that registration between imaging devices is performed continuously. Further, a link according to arrow L25 may be provided. Particularly, it may be provided if the computer vision algorithm utilizes thermal imagery originating from the thermal imaging device 2.0. A link according to arrow L36 is provided when imaging modalities originating from the additional imaging devices 3.0 are used in description of classes of unreliable objects 1.0 and/or unreliable object detection and segmentation 6.0. A link according to arrow L35 is provided if additional imaging devices 3.0 are used and if the computer vision algorithm envisions usage of data captured by these devices. Any used imaging devices produce the set of input images 5.0 which comprises one or more images of various modalities, dependent on a number and technical properties of utilized imaging devices.

Detection and segmentation of unreliable objects (6.0) in the scene is performed based on the description of unreliable object classes (1.0). It includes analysis of the thermal image 4.0 and, optionally, images originating from additional imaging devices. In the present invention, detection may be a pre-requisite for segmentation, or can be an outcome of the segmentation process.

In an embodiment, detection refers to the process of detecting existence of a certain unreliable object in the thermal image 4.0, given the description of the unreliable object class, included in 1.0. E.g. an existence of human bodies in the image can be performed by detecting human faces in the thermal image. E.g. we can assume that the human face, when fully visible, is approximately round, and that the temperature of the skin is in the range of 35° C.-39° C. (described thermal property, i.e. intrinsic thermal characteristic of the human skin). As a first step of the detection, pixels that satisfy any temperature threshold(s) are selected, and grouped in the connected regions, assuming that two pixels belong to the same region only if the Euclidean distance between them is not more than a pre-defined number of pixels, as measured in the image. Once connected regions of pixels are created, parameters of an enclosing ellipse are computed using the iteratively re-weighted least squares algorithm, and taking into account only pixels defining the outer boundary of the region. Then, each region is detected as a human face if the following parameters satisfy a set of pre-defined thresholds: number of pixels enclosed within the ellipse that satisfy temperature thresholds; ratio of number of pixels within the ellipse that satisfy and do not satisfy temperature thresholds; ratio of shorter radius and longer radius of the ellipse. In this manner, human faces are detected in the image. Following detection of human faces, human bodies can be extracted from the image using a segmentation algorithm.

In an embodiment, segmentation of unreliable objects in the image can be performed by one of the following algorithms or combinations thereof: image thresholding, region growing, adaptive snakes, level-set segmentation, k nearest neighbor, support vector machines, expectation maximization parameter fitting, or any other method available.

The image used for detection and/or segmentation of image regions corresponding to the unreliable objects, for which a corresponding unreliable object class description is provided, can be a thermal image that, for each pixel, contains its temperature or encoded temperature. Further, it can be a multi-modal image that, for each pixel, contains its thermal properties and some additional information. E.g. the multi-modal image for detection and segmentation can be constructed to contain the temperature and RGB values for each pixel in the image.

Once unreliable objects are detected and segmented, the segmented region may be transferred from the coordinate system of the image used for the detection and segmentation to the respective coordinate system corresponding to the set of input images 5.0 according to the alignment and/or spatial relationship between the imaging devices (including the thermal imaging device 2.0 and optionally the additional imaging devices 3.0). Then, the set of labelled input images 7.0 can be created and provided as an input to the computer vision algorithm 8.0.

Figure 4:
FIGS. 4, 5 depict a respective unreliable object class description according to respective embodiments.

Given an unreliable object class description in the form of the embodiments presented in FIGS. 4 (1.1) and 5 (1.2), object detection and segmentation 6.0 can be achieved via thermal or multimodal image thresholding. E.g. a multimodal image which encodes color and temperature can be thresholded in both color and temperature domain using pre-defined set of thresholds.

Figure 5:
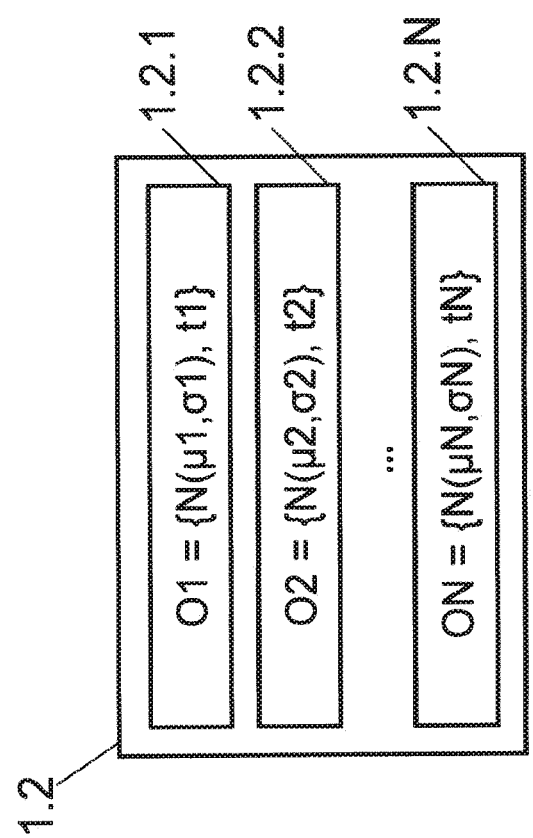

Regarding the unreliable object class description in the form of the embodiments presented in FIGS. 4 and 5, further explanation is given below. In the respective rows denoted as 1.1.1 to 1.1.N and 1.2.1 to 1.2.N, a respective object class description for respective object classes 1 to N is given. In FIG. 4, "min" and "max" define respective minimum and maximum values of a particular characteristic to be defined, such as temperature. E.g. in case a thermal image pixel value is within these thresholds, then the pixel may be denoted as belonging to an unreliable object class. In FIG. 5, description of an unreliable object class comprises a normal distribution function defined by its mean (μ) and standard deviation (σ), and a thresholding function (t). In this case, the normal distribution function may be used for computing the probability of belongingness of a pixel or an image region to a respective unreliable object class. Further explanations of FIGS. 4 and 5 are given below.

In another embodiment, instead of image thresholding, other advanced image segmentation algorithms could be utilized to connect regions which comprise multiple image regions which satisfy a description of unreliable object classes. E.g. in case humans are described as a class of unreliable objects, some regions of the human body can be covered with clothes, and thus have a different temperature than (naked) skin regions. In this case, narrow band temperature based thresholding might fail. On the other hand, wide band thresholding could falsely detect many regions in images as humans. Therefore, in order to segment the complete region in the image, corresponding to a human, alternative segmentation together with temperature information could be utilized, such as, but not limited to, region growing, clustering methods, split-and-merge methods, model based segmentation, histogram based methods etc. For example, a region detected or segmented by thresholding may be used as a starting point (or seed) for the region growing.

According to another embodiment, a set of freely moving smartphones, which individually incorporate one or more cameras, are observing the environment. Each smartphone in the scene includes one or more cameras which could be of, but are not limited to, any of the following types: visible light cameras, RGB cameras, RGB-D cameras, time-of-flight cameras, thermal cameras, infrared cameras, depth cameras etc. Smartphones are either static or dynamic and the goal of the computer vision algorithm, executed in the microprocessor unit of the smartphone is to localize the smartphone camera in space. For this purpose, a tracking, localization and mapping algorithm is deployed. Further, a number of smartphones are equipped with a thermal camera and optionally with a visible light camera, while the others incorporate only visible light cameras. Humans are classified as a class of unreliable objects, with regard to the tracking, localization and mapping algorithm executed. Detection and segmentation of unreliable objects is performed based on their thermal properties, utilizing processing devices of the smartphones equipped with thermal cameras. Once the segmented images are obtained according to thermal images captured by the thermal cameras, these are transferred to devices that do not have thermal imaging capabilities, and registered with visible light images captured using cameras incorporated in these devices. Here, registration between segmented images allows for mapping of unreliable image regions from coordinate systems of segmented images, into coordinate systems of visible light images, captured by the smartphones which do not have thermal imaging capabilities. In this manner, image regions of visible light images are labelled as either reliable or unreliable, and only reliable image regions are used as an input of the tracking, localization and mapping algorithm. In this example, the at least one probability associated with at least one image region in the thermal images or visible light images is binary.

Figure 6:
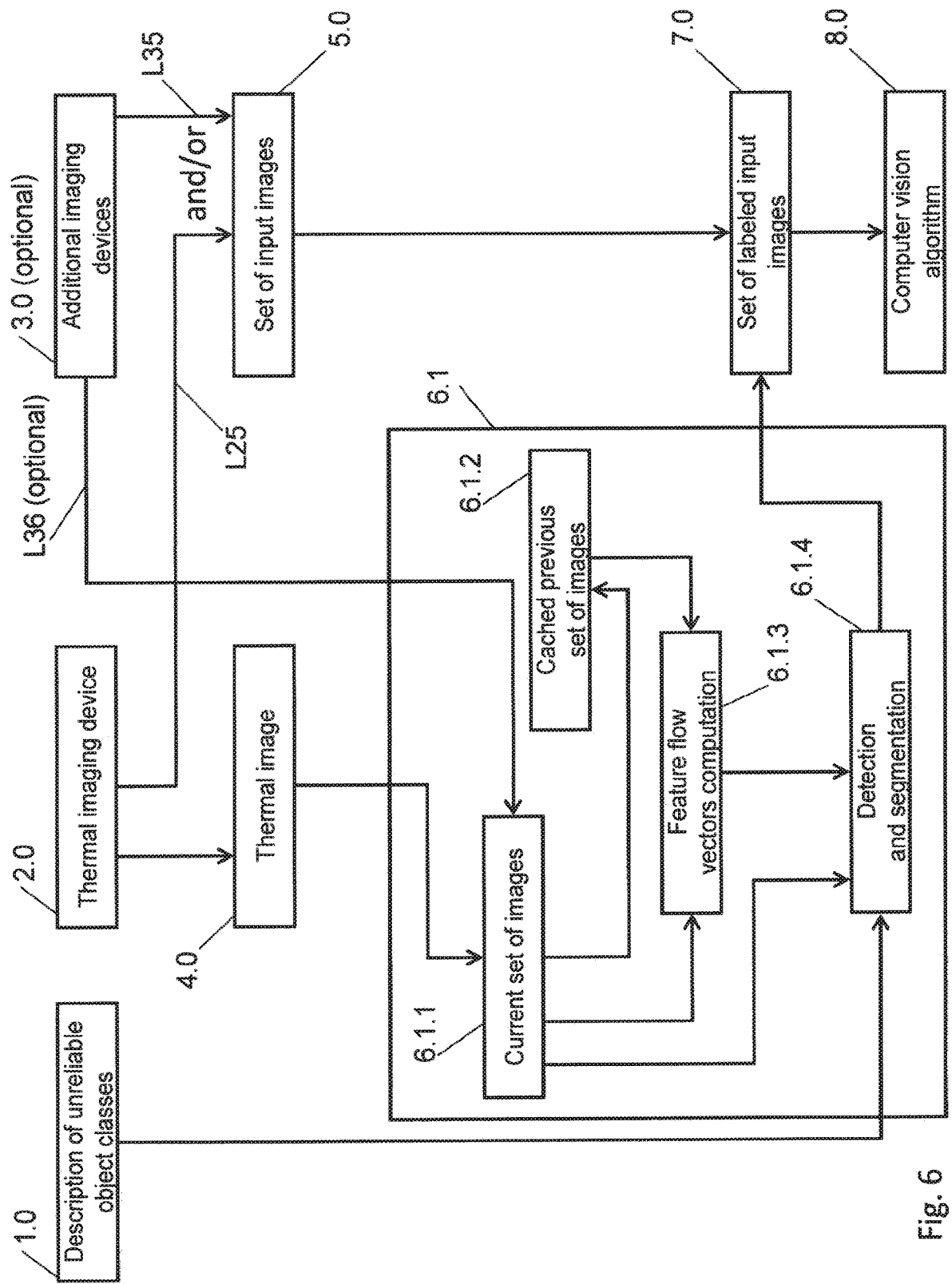
FIG. 6 shows an embodiment regarding detection and segmentation of unreliable objects which can be aided by computation of feature flow vectors between current and previous images.

In an embodiment presented in FIG. 6, detection and segmentation of unreliable objects (6.1) can be aided by computation of feature flow vectors between current and previous images. The remaining components in FIG. 6 would be the same as the corresponding ones described with reference to FIG. 3. The current images are captured at a different time when the previous images are captured.

Knowledge regarding flow vectors provides an additional clue about the scene geometry. E.g. if an object is moving in the scene, flow vectors of image regions, corresponding to such object, have locally similar magnitude and/or orientation. Further, if an object is static relative to the environment and occupies space at a certain bounded distance from the camera, flow vectors incurred by a camera movement will have approximately equal magnitudes, depending on the distance from the camera and the size of the bounded space. In such manner, thermal properties of unreliable object classes can be combined with a 2D connectivity (determined by a neighborhood of a pixel) and 3D spatial connectivity (determined by the optical flow magnitudes and orientations), to achieve more robust detection and segmentation of unreliable object classes. E.g. in case a region growing algorithm is used for segmentation of unreliable objects in the scene, image regions can be assigned to the same unreliable object segment if they have locally similar temperature and optical flow vectors. Flow vectors could be computed for features in thermal images, as well as for images of different modalities (e.g. images captured by the additional imaging devices 3.0). According to the present embodiment, the current set of images 6.1.1 comprises the thermal image 4.0 and possibly additional images captured by at least one of the additional imaging devices 3.0. The cached previous set of images 6.1.2 comprises a thermal image (e.g. a thermal image captured by the thermal imaging device 2.0 at a time different from capturing the thermal image 4.0) and possibly additional images captured by at least one of the additional imaging devices 3.0.

As a remark, once the detection and segmentation process is completed, the current set of images 6.1.1 may be stored in a memory corresponding to the cached previous set of images 6.1.2. Flow vectors can be computed based on, but not limited to, one of the following image features: 2D pixels, 2D image patches, 3D image regions, 3D pixels, edge-features, circular or cylindrical features, planar structures, 3D structures etc. E.g. flow vectors of image pixels can be computed using optical flow approaches. In another embodiment, flow vectors of distinctive feature points are used. Distinctive feature points are usually computed in computer vision detection-description framework. Common distinctive feature points include SIFT, SURF, BRISK, FREAK, Harris Corners, FAST etc.

In an embodiment, flow vectors in the image originate from 2D features, which provide additional clues regarding image 3D structure, and are used for spatial detection and segmentation, combined with thermal properties of classes of unreliable objects. According to triangulation rules, 3D positions of 2D points can be computed given their 2D flow vectors and camera poses, assuming a static object and a moving camera.

In another embodiment, a description of an unreliable object class comprises one or more single- or multi-variable functions. Let us denote a number of outputs per pixel of these functions with "K". Let us denote a number of imaging modalities in which flow vectors are computed (6.1.3) with "L". Further, let us denote combined dimensionality of images in the current set of images 6.1.2 with "M". Here, a dimensionality of images refers to the length of a vector that encodes image information for a pixel. E.g. if the current set of images 6.1.1. comprises only one 2D thermal image, then M=1, which corresponds to a grayscale value encoding temperature of a pixel. If an additional RGB image is included in the current set of images 6.1.1., then dimensionality increases by 3, i.e. M=1+3=4. Further, it is assumed that images are registered mutually, i.e. an alignment that enables transferring pixel locations from one image to the other is assumed to be known. In this manner, total dimensionality of input data available, denoted as I, available to the detection and segmentation block (6.1.4) is equal to the sum of K (outputs of functions used in an unreliable object class description), L (number of imaging modalities used to compute flow vectors) and M (combined dimensionality of the images comprising 6.1.1). Unreliable object detection and segmentation can be performed using all or part of the input data I, and it can be performed by any of the previously mentioned methods.

In the following embodiment, unreliable object detection and segmentation is performed using a thermal image and two consecutive visible light images (e.g. two RGB images captured by a RGB camera at different times). The explanation is provided for only one unreliable object class defined, but a similar process can be performed if more than one class is defined.

The detection and segmentation process can be performed in either the thermal image coordinate system, or in the coordinate system of one of visible light images. Alternatively, detection and segmentation may be performed in any other coordinate system, for which the mapping functions from thermal and visible light images are known. In one case, this embodiment envisions construction of a multi-modal image for the purpose of detection and segmentation that contains temperature information and additional pieces of information originating from two consecutive visible light images, for at least a certain number of pixels in the image, if not for all pixels in the image. Let us assume that the multi-modal image for detection and segmentation is built in the coordinate system of the visible light image, and that it is aligned with the visible light image. It is assumed that the thermal image is spatially (and optionally temporally) aligned with at least one visible light image. Given known alignment between the thermal image and the at least one visible light image, temperatures of pixels in the at least one visible light image are either directly transferred from the thermal image or interpolated. Pixel temperatures in visible light image coordinate system are interpolated when exact correspondence between a point in the thermal image and point in the at least one visible light image cannot be determined due to absence of distinctive texture and/or similar texture along the epipolar line.

Further, in this embodiment, with reference again to FIGS. 4 and 5, a description of an unreliable object class 1.0 is given in the form of a normal distribution of temperature $N(t,\mu,\sigma)$, where t is the temperature (e.g. derived from pixel information of the thermal image), $\mu$ is the mean of the distribution and $\sigma$ is the standard deviation of the distribution. The normal distribution function and its parameters are indicative of thermal properties of the class of unreliable objects, i.e. their intrinsic physical thermal properties. Description 1.0 also includes the minimal probability threshold pmin, which a pixel has to satisfy in order to be provisionally labelled as an unreliable object. The output (i.e. probability values) of the normal distribution function is denoted with o. Given temperature (denoted by t) of the pixel, the probability (denoted by o) of a pixel (of an object) belonging to a human class is computed using the known single variable normal distribution formula:

$$o = N(t, \mu, \sigma) = \frac{1}{\sigma\sqrt{2\pi}} e^{\frac{-(t-\mu)^2}{2\sigma^2}}$$

The computed probability (i.e. output o) may be associated with image regions in the thermal image or corresponding image regions in the visible light image. Image features detected in these images may also be assigned probabilities.

The computed probability (i.e. output o) may be further binarized according to the threshold pmin. For example, given computed o, the pixel with temperature t is initially labelled as lying on the unreliable object if o>pmin.

The probability value computed from thermal information may be further utilized together with the additional information (e.g. derived from visible light images). For this purpose, other properties, e.g. spatial properties or visual properties related to the unreliable object class, may be provided. These properties may be included in the description. For example, the description of the unreliable object class may also include a minimal number of spatially connected pixels umin, in order to accept the segmented region as an unreliable object.

In this embodiment, optical flow vectors are computed from the two consecutive visible light images. Optical flow of a pixel is denoted with f=(fx,fy), where fx is optical flow in x direction, and fy is the optical flow in y direction, in the coordinate system of the visible light image that is aligned with the thermal image. In case flow vectors are available only for sparse image regions, flow vectors for pixels can be computed via interpolating functions. As an alternative to this approach, detection and segmentation can be performed by taking into account only sparse image regions, for which both temperature and flow vectors are available, while resulting segmentation of sparse image regions can be interpolated to correctly label any remaining image regions. In this embodiment, a region growing algorithm is used to segment the unreliable objects in the image. For this purpose, a multi-modal image may be created by merging image information (e.g. pixel intensities, flow values, and/or probabilities) from the thermal image and the two consecutive visible light images into a common image coordinate system, e.g. in the coordinate system of one of the two consecutive visible light images. For example, the segmentation in the thermal image starts from an initial image region determined from the thermal property only, and then the initial image region may "grow" according to the related flow values and/or color information derived from the visible light images. In this manner visual properties related to the unreliable object class may be employed in the segmentation procedure. For example, the visual properties may define which color or similar colors has to be included into the unreliable object class and thus image regions in the thermal image, which has such the colors, may be added to the segmented region during the "growing" procedure.

Here, the multi-modal image constructed for the detection and segmentation is denoted with I(x,y)=(o,f), where (x,y) are pixel coordinates in the image plane. Alternatively, a constructed image can be perceived as a 4-dimensional space, with each point in space having coordinates in the form of a vector C=(X,Y,O,F). Then, coordinates C can be transformed in case it is necessary to facilitate segmentation. E.g. in case a segmentation process envisions usage of distance functions, multidimensional coordinates could be scaled in such a way to correctly balance the influence of different dimensions on the utilized distance functions. Given I, the segmentation image can be segmented using the region growing algorithm. Seed pixels are randomly drawn in the image, with condition that o>pmin. Region growing can be executed using a known recursive algorithm, and will not be explained in detail here. A notable aspect of this embodiment, with regard to the region growing algorithm, is the algorithm for establishing if the neighboring pixel is part of the segment, i.e. lying on the unreliable object. Firstly, the probability o is computed for the currently analyzed pixel. If o>pmin, then it is proceeded with analysis of flow vectors. Optical flow vector magnitudes should be locally similar. For this purpose, a threshold fd is used. Firstly, the squared magnitude of the optical vector fM is computed for the currently analyzed pixel fM=fx2+fy2. Then, the squared magnitude of optical flow vectors is computed for 8 immediate neighboring pixels. Let us denote a squared optical flow of a neighboring pixel with fM'. Finally, the pixel is labelled as belonging to a class of unreliable objects (e.g. humans) if the following two conditions are satisfied: o>pmin, and |fM−fM'|>fd for at least 4 neighboring pixels. In this manner, a whole region can be segmented. The region growing algorithm is finalized when all pixels having o>pmin were analyzed. Finally, each segmented region that is labeled as the unreliable object but has fewer than umin pixels is considered to represent a noise present in the image, and it is thus relabeled as not lying on the unreliable object. In this manner, all image pixels are labeled as being either parts of unreliable objects or not, and thus the segmentation is finalized. In another embodiment, segmentation is performed using a one-class support vector machine (SVM) clustering algorithm, instead of employing the region growing algorithm. Compared to the regular SVM which delineates clusters with hyperplanes, one-class SVM delineates clusters with hyperspheres. Seeding of the algorithm is performed according to the unreliable feature description (i.e. with certain values in the O dimension in the same manner as above. Alternatively, seeding of the one-class SVM could be done utilizing the segmentation results obtained using the region growing or some other segmentation algorithm. Finally, the set of segmented regions is used to construct the set of labelled input images (7.0).

In another embodiment of the present invention, segmented regions corresponding to unreliable object classes, are excluded from the input of the camera localization, tracking and/or mapping algorithm. According to this embodiment, image features belonging to segmented regions are not used for camera localization, pose tracking or for map building.

Figure 7:
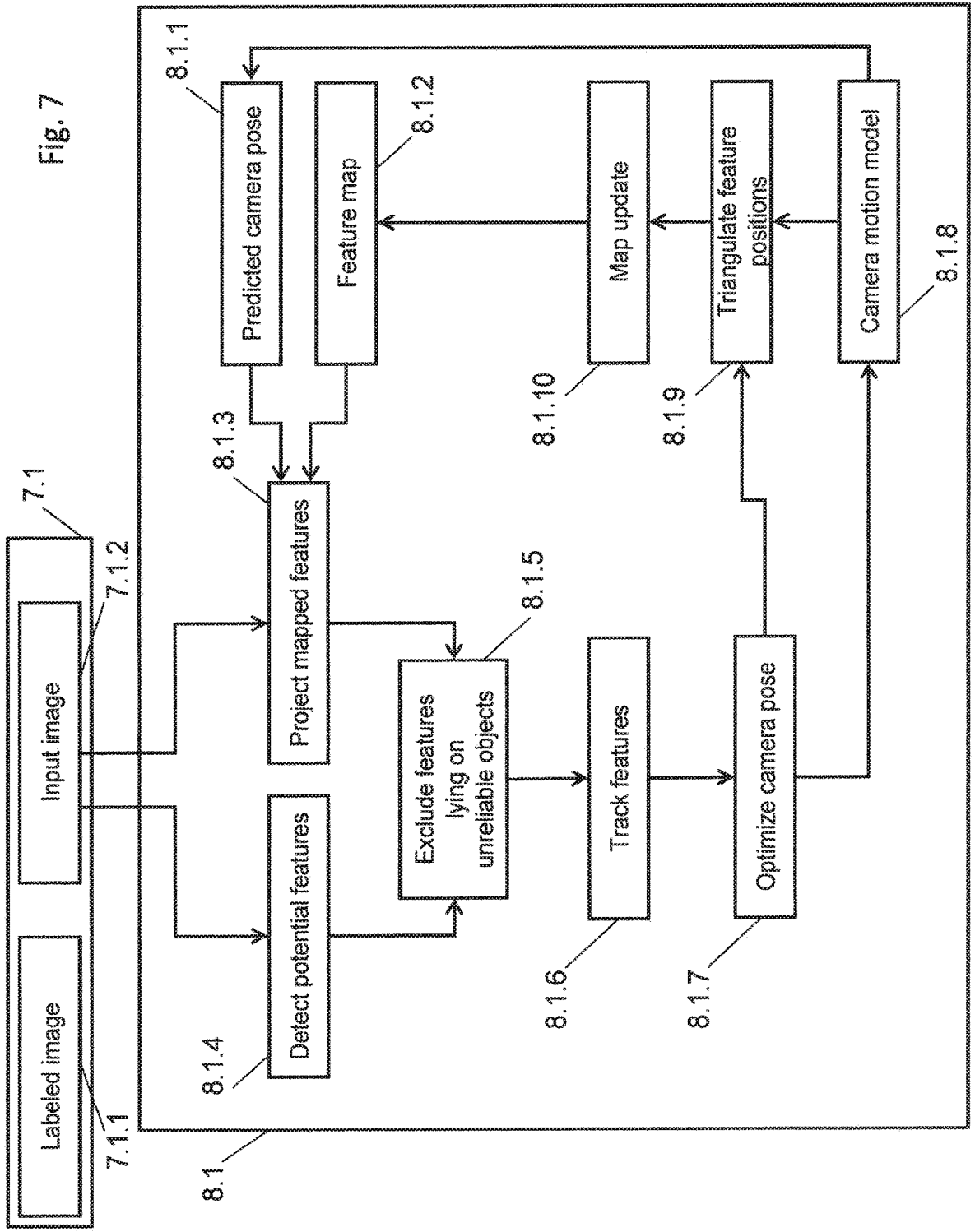
FIG. 7 shows an embodiment of a computer vision algorithm using a set of labelled input images as input.

FIG. 7 shows an embodiment of a computer vision algorithm 8.0 using a set of labelled input images 7.0 as input.

According to this embodiment, unreliable object detection and segmentation is performed with a goal of increasing robustness and accuracy of the parallel tracking and mapping algorithm (PTAM) (see, e.g., reference [8]), as presented in FIG. 7. The PTAM algorithm detects and tracks distinctive image features in a video stream, comprising consecutive images, computes camera poses with regard to the environment, and in parallel builds a map of the environment by computing 3D positions of tracked distinctive image features. As the camera moves through the space, new distinctive image features are discovered, tracked and their 3D positions are computed. New features are then added to the map of previously mapped distinctive image features. The map of distinctive image features, along with corresponding camera locations and orientations from which features were visible, can be optimized using the bundle adjustment algorithm. The used image features may represent small image patches, histograms of gradient orientations, line segments, ellipses etc.

The set of labelled images 7.1 comprises a labelled image 7.1.1 and an input image 7.1.2. The input image 7.1.2 is an RGB image in this example. A diagram of the PTAM algorithm is presented in block 8.1. The block 8.1 does not include elements related to keyframe selection and bundle adjustment. Firstly, previously mapped image features, that are stored in the feature map 8.1.2, are projected (8.1.3) using the predicted camera pose 8.1.1, which corresponds to the image 7.1.2. Here the predicted camera pose 8.1.1. is computed using at least one previously computed camera pose, computed in block 8.1.7 and an associated camera motion model 8.1.8. Once the first set of labelled images 7.1 is provided to the algorithm 8.1, there will be no previous pose available. In this case the algorithm could assume that there is no motion, and rely only on feature tracking 8.1.6 to establish correct point correspondences. In parallel, new image features are detected in the image, utilizing a feature detector algorithm, e.g FAST, SURF, SIFT etc. Then, both projected features and newly detected features, lying in image regions labelled as parts of unreliable objects, are excluded from the further computations 8.1.5, as explained in the following. Already mapped features, stored in the feature map 8.1.2, are temporarily disabled, and newly detected features, computed in block 8.1.4, are discarded. Afterwards, remaining features, i.e. both newly detected features 8.1.4 and projected mapped features 8.1.3, which are not lying on unreliable objects, are tracked (8.1.6) in the input image. Feature tracking may be performed using the Kanade-Lucas-Tomasi method (KLT tracker). In block 8.1.7 camera pose is optimized using the successfully tracked features. Remaining blocks correspond to the standard operations performed in PTAM algorithm: camera motion update 8.1.8, triangulation of feature positions 8.1.9 and map update 8.1.10.

According to another embodiment, classes of unreliable objects are excluded from tracking and mapping algorithms, where the at least part of the environment captured in the set of labelled input images 7.0 is part of a rigid, deformable or an articulated object. Further, the at least part of the captured environment may be rich in texture or poorly textured. Further, the tracking and mapping algorithms may be utilized with the goal of estimating a camera pose in the range of applications, such as augmented reality aided indoor and outdoor navigation, industrial augmented reality applications for aiding mechanics in maintenance tasks, augmented reality aided medical procedures etc.

In another embodiment of the present invention, segmented regions corresponding to unreliable objects are excluded from the input of object detection, classification and/or recognition algorithms. With regard to this embodiment the object can represent, but is not limited to, any of the following: 2D images, 3D images, digital representations of planar, non-planar objects and 3D scenes. A main difference with regard to the standard object detection, classification and/or recognition algorithm pipeline is that feature extraction is performed only from the image regions that are not labelled as parts of unreliable objects.

According to another embodiment, unreliable object detection is performed using both thermal images and registered visible light images. Unreliable object description may be given only with regard to intrinsic thermal properties of the object. E.g. the thermal properties can be described by, but not limited to, any of the following or combinations thereof: minimal and maximal temperature thresholds, probability density functions, minimum object size in pixels, thermal image gradients, thermal image intensity histograms, thermal image local binary patterns, Fourier transform coefficients, wavelet transform coefficients etc. Let us now assume that the unreliable object class description is given in the form of a probability density function of temperature, e.g. a normal distribution function with known mean and standard deviation. Using this function, it is possible to determine a probability p(u) for each pixel in thermal image indicating belongingness to the unreliable object. Further, in this embodiment a threshold pthr is used to facilitate unreliable object detection and segmentation, as explained later. Further, it is assumed that it is possible to transfer thermal image pixel locations to the coordinate system of the visible light image, thus determining pixel temperatures in the visible light image. The process of pixel transfer can be achieved for example using homography transfer, via fundamental/essential matrix accompanied with the search along the epipolar lines, using a given look-up table etc. Once the pixel temperatures are mapped to the visible light image, all pixels that have the probability p(u) higher than pthr are selected, and for each selected pixel a local texture description is computed using local binary patterns (LBP), as proposed by Ojala and Pietikainen in [9]. A main difference of the algorithm utilized in this embodiment, with regard to [9], is that only pixels with p(u)>pthr are used for building LBP histograms, while the contribution of each separate LBP value is weighted with the p(u) of the corresponding pixel. The actual splitting is performed at the median X image coordinate, and median Y image coordinate of all points in the block, that have p(u)>pthr.

Further, blocks with low ratio of pixels having p(u)>pthr, with regard to the total number of pixels in the block are immediately considered as noise, and not considered as parts of unreliable objects. In this manner, a whole image is segmented in blocks corresponding to unreliable objects, and blocks that do not correspond to unreliable objects.

According to another embodiment, instead of creating a labelled image 7.1.1 in the coordinate system of the input image 7.1.2, the exclusion of distinctive image features lying in parts of the image 7.1.2 corresponding to the unreliable objects, can be performed as follows. Firstly, distinctive image features are extracted in the image 7.1.2. Then the location of each distinctive image feature is mapped to the coordinate system in which the detection and segmentation of unreliable objects is performed (e.g. thermal image 4.0). If the mapped feature position is lying in the image region labelled as the unreliable object, it can be simply excluded from the further processing by the computer vision algorithm 8.0. In this manner the computational expense of creating the labeled image 7.1.1 is avoided.

FIG. 8 shows another embodiment of a computer vision algorithm 8.0 using the set of labelled input images 7.0 as input. In this embodiment, exclusion of image regions corresponding to unreliable object classes is performed with the goal of aiding an object detection algorithm based on the "bag of (visual) words" approach. In FIG. 8, an overview of such algorithm is presented. The goal of the algorithm is to find images in a database containing a certain object, given a number of query images of the query object. The initial stage of a "bag of words" approach comprises the building of a dictionary. In this stage, image features are extracted and described from images in the database or any other set of images, and clustered according to their descriptors in such way, so that every cluster represents a "visual word". The descriptor thereby can be any function mapping an image patch to a (real-valued or integer valued) vector which we refer to as feature descriptor. Feature descriptor of an image patch can be also computed from a set of synthetically computed patches, by applying pre-defined warping function to an original patch. Examples for such descriptors include SIFT, SURF, BRIEF, ORB, BRISK, HOG, and as disclosed in [15]. In this manner, mapping from image features to visual words is defined by taking the nearest neighbor of an image feature within the dictionary of visual words. Then, for each image, or image region, an occurrence frequency of each visual word is computed. In this way a visual word frequency vector is built which represents an image, or an image region. In the object detection stage of the algorithm, the same image features, which were used in the dictionary building stage, are extracted from the input image 7.2.2, or image regions, containing a query object (8.2.1). With respect to the labelled image 7.2.1, it is referred analogously to the description as set out above with respect to FIG. 7.

Then, according to this embodiment, features lying in image regions labelled as parts of unreliable objects are excluded (8.2.2). Afterwards, the remaining (i.e. not excluded) features are mapped to visual words (8.2.3), and the visual word frequency vector (8.2.4), representing the object, is computed.

According to another embodiment, instead of excluding a part of the detected features, features detected in the input image 7.2.2 may have feature probabilities indicative of their belongingness to the unreliable object class, determined according to the thermal image, the unreliable object class description and optionally images from additional imaging devices. Each image feature represents at least part of a real object. Then, instead of simply excluding image features with the high probability of belongingness to the unreliable object, given a predefined threshold, influence of the feature in the visual words frequency histogram can be weighted according to its probability.

Finally, the object detection is performed by searching for correspondences (8.2.5), of the computed visual word frequency vector, in the set of pre-computed visual word frequency vectors representing images in the database accessing a visual word/frequency vector database 8.2.6. Given a similarity measure and associated thresholds, an image, or an image region, is said to contain or not contain the query object if the similarity between the frequency vector of the image and the nearest neighbor in the database is below or above the threshold. Evidently, eliminating features resulting from regions of an image which belong to classes of unreliable objects, which do not originally comprise the query object, can significantly improve the object detection algorithm as presented.

In another embodiment, unreliable object detection and segmentation is performed with the goal of excluding unreliable image features from an image recognition algorithm. A camera rig comprises a thermal camera and a visible light camera, that are rigidly fixed on a mount. The camera rig can freely move in space. The two cameras have parallel view vectors and their optical centers are very close to each other. In this embodiment, humans are classified as an unreliable object class, and are described via temperature limits: minimal pixel temperature, and maximal object temperature.

In the present embodiment, humans are detected and segmented in the thermal image. Afterwards segmented regions are transferred to the corresponding visible light image. Further, it is assumed that intrinsic parameters are known for both cameras, as well as the 3D Euclidean space transformation between camera coordinate systems. It is also assumed that the capturing frequency of both images is sufficiently high, so that temporal difference between images aligned in time, is not higher than a preset maximal threshold. Further, it may be assumed that a physical image print-out, i.e. a physical target to be recognized based on a computer vision method or system, will always be placed in a certain range of distances from the camera rig. The minimal distance is denoted with Zmin (e.g. 0.2 m) and maximal distance Zmax (e.g. 1.2 m). Since the goal of human detection and segmentation in this context is to exclude a possibly occluding object (e.g. that occludes at least part of the physical target), it is important to transfer segmented region boundaries from the thermal image to the visible light image.

In the present embodiment, exact pixel correspondences between image coordinate systems may not be deemed important, as long as pixels corresponding to humans in the visible light image are marked unreliable. For this reason, a transfer of image locations from the thermal image coordinate system to the visible light image coordinate system will be modeled using a homography transformation Ht2v. This homography transformation Ht2v is for example computed using the intrinsic parameters of the cameras, the known 3D rigid body transformation between the camera centers, and assuming that the imaged plane is fronto-parallel to the camera imaging planes, and is located at the distance of Zmax.

Given the assumed fixed distance of the plane from the camera, which will often be incorrect in many practical scenarios, it is important to compute the maximal disparity error. Given the assumption that the physical image print-out of the query image will not be placed closer than Zmin distance from the camera, the homography transformation Ht2v_min is computed using the known intrinsic parameters of the cameras, known 3D rigid body transformation between camera centres, and assuming fronto-parallel plane at distance Zmin.

Next, the selected 3D point P is projected to the thermal camera image using known intrinsic parameters, and setting extrinsic parameters to identity. Then, the projected point (p) in thermal image coordinate system is transferred to the visible light image coordinate system using homography Ht2v and Ht2v_min. The absolute distance between a point's locations, obtained using these two homographies, may be denoted as the maximum disparity dmax.

Following the computation of Ht2v and dmax, segmented regions in thermal image labeled as humans can be transferred to the visible light image coordinate system. The process of detection and segmentation of humans in captured thermal images is performed as follows. In order to facilitate the segmentation process, an 8-bit gray-level mask image Itm is created, having the equal size as the thermal image. Each pixel in the thermal image is analyzed against the minimal and maximal temperature thresholds of each provided description of unreliable object classes, and every pixel that has an imaged temperature between these two values is labeled with 255 in the mask image Itm, while pixels that do not satisfy these thresholds are labeled with 0. Then, another 8-bit gray-level mask image, Ivm, in the coordinate system of the visible light image is created. Pixel values in the mask image Ivm are transferred from the mask image Itm using the inverse of the homography Ht2v. Pixels that fall outside of the coordinates of the Itm, are labeled either with 0 or with 255, depending on existence of regions segmented as humans in Itm. In case there are no pixels labeled as lying on humans, then all pixels in Ivm, that have coordinates outside of the Itm when computed using inverse Ht2v, are labeled with 0. Otherwise, such pixels are labeled with gray-level intensity 255. In order to compensate for maximum possible disparity dmax, incurred by usage of the Ht2v and its inverse, morphological dilation is utilized on the image Ivm. In case of a square mask, the side of the square should be set to 2*dmax+1.

Finally, having obtained the mask image Ivm, it is possible to proceed with the image recognition scenario. The visible light image is analyzed and image features are extracted from image regions from the visible light image, that are labeled with 0 in the mask image Ivm, thus taking into account only image regions that are not labeled as humans (i.e. unreliable objects) in the thermal image. Once features are extracted, the standard feature image matching against the database can be performed, e.g. based on the image features, feature frequency, visual word frequency etc.

According to another embodiment, knowledge regarding detected and segmented unreliable objects is also utilized in the geometric verification of results obtained by an image recognition system. In this embodiment, a thermal and a visible light camera are used. Intrinsic parameters of both cameras are known, as well as the transformation between the camera centers, allowing for transfer of pixel locations between images coordinate systems, corresponding to these cameras. A visible light image is used as an input of the image recognition system. Description of the unreliable object classes is given with regard to their thermal properties, possibly combined with spatial properties and properties discernible in the visible light spectrum. In order to increase robustness of the image recognition algorithm, detection and segmentation of unreliable objects is performed. In this manner, pixels in the visible light image are classified in two classes: reliable and unreliable, depending if they lie on the detected and segmented unreliable objects or not. Point-based distinctive image features are used to compare captured images against the images in the database. In this step, features lying on unreliable pixels are discarded. In this manner, correspondences for these features are not determined. Once the set of features is extracted from the visible light image, it is possible to compare these features with the features corresponding to the images in the database, and determine the list of best matching images. In order to prune the list, a geometric verification algorithm is deployed, e.g. as proposed by Tsai et al. in [13]. Given exclusion of unreliable and occluding objects from the feature extraction and matching algorithm, a lower number of false feature correspondences is detected. Consequently, accuracy and robustness of geometric verification algorithm is also increased.

In another embodiment, cameras rigidly mounted on a vehicle are traversing the environment, with the goal of obtaining a 3D reconstruction of the environment. E.g. cameras mounted on a car could traverse the city and capture images that are used to reconstruct the 3D model of the buildings observed. In this scenario, many objects will be observed, in addition to the buildings which reconstruction is desired. Objects, that are not buildings, e.g. cars and people, should preferably be excluded from the 3D reconstruction. In order to achieve this, a thermal camera can be added to the system, and known thermal properties of unreliable objects, e.g. cars and people, can be used to detect and segment such objects in images, and consequently exclude them from the 3D reconstruction. Alternatively, intrinsic thermal properties of the objects can be combined with their known spatial characteristics, e.g. car detection can be constrained in such manner, so that objects that have height greater than a given threshold, will not be taken into account.

In another embodiment, a thermal camera can be used to detect and segment windows of the buildings. Let us assume that a SLAM algorithm is utilized to localize and track the camera, and map the environment. Further let us assume that the system contains a thermal and a visible light camera, which are mutually registered, i.e. it is possible to transfer image regions between coordinate systems of these two cameras. Further, the SLAM algorithm includes extraction and description of image features, that could either originate from visible light images, thermal images, or image features can be computed using the information originating from both visible light image and thermal image. Alternatively, there may be used additional imaging devices of possibly different imaging modalities, and images originating from such devices could also be used to compute image features. The presence of windows in the scene to map can be seen as detrimental to the SLAM algorithm, since reflections and specularities can introduce many unstable image features that may be highly unreliable when used for 3D reconstruction. In many situations, windows could be easily detected in the thermal image. E.g. when the environmental temperature is low (e.g. below 0° C.), then windows can be seen as rectangular surfaces that have higher temperature than the environment, due to internal heating in buildings. Vice versa, when the environmental temperature is very high (e.g. 35° C.), the windows may be seen as rectangular regions that have much lower temperature than the environment, due to internal cooling in the building.

In both cases, windows can be considered as instances of unreliable object class, and described with regard to their thermal and geometric properties. It may be assumed that windows are delineated with straight lines that are either perpendicular or parallel to the gravity vector, and that they have uniform temperature across the surface. Then, in the detection and segmentation of the unreliable objects, straight lines that are perpendicular or parallel to the gravity vector can be initially extracted from the image. In the next step, closed regions delineated with such connected lines can be segmented. In this step, one may use image rectification process based on vanishing lines and vanishing points, that are computed using lines delineating windows (if it is assumed that lines delineating windows are either normal or parallel to each other, and to the gravity vector). Once the closed regions are detected, further heuristics can be used to extract only windows, and remove outliers. E.g. one may assume that windows are rectangles with 4 sides and with uniform temperature across the surface. Then only segments that have 4 sides and which have temperature of the pixels in the certain range can be detected and segmented in the images. In this manner, an input to the SLAM algorithm can be computed which comprises input images and segmented unreliable object, i.e. windows in this case. Based on this information, a SLAM algorithm would be able to neglect image features computed in the parts of the image that were segmented as unreliable objects, i.e. windows in this case. This would lead to an increase in robustness and accuracy of the algorithm, by avoiding potentially unstable image features that are originating from reflections and specularities often visible on the windows of the buildings.

Generally, the following further aspects and embodiments may be applied in connection with aspects of the invention.

Camera:

A camera is also called an imaging device or capturing device. The present invention can generally be applied with any camera providing images. It is not restricted to cameras providing color images in the RGB format. It can also be applied to any other color format and also to monochrome images, for example to cameras providing images in grayscale format or YUV format. Cameras may provide measurements for sensor pixels synchronously as images or frames. Cameras may also provide measurements asynchronously for each sensor pixel individually, e.g. only when an intensity change has been detected, as is the case for event cameras.

A camera often has intrinsic parameters including the focal length and the principal point. A camera may capture light that is visible to the human eye. A camera may also capture light that is invisible to the human eye, such as infrared light. For example, the camera may be a thermal imaging camera or infrared camera which measures long wave infrared light. Radiation at this wavelength is emitted by objects above absolute zero temperature and the amount of radiation correlates with the temperature. Therefore, a long wave infrared (thermal) camera enables measuring the temperature of imaged objects.

A camera providing an image with depth data is often called depth camera. A depth camera could be a time of flight (TOF) camera or a passive stereo camera or an active stereo camera based on structured light. A depth camera may provide images whose pixels represent only depth data. A depth camera may capture both the light and depth data in a single image, e.g. RGB depth image. For the depth camera, the depth data does not need to be provided in the same resolution as the (color/grayscale) image.

For a standard camera model with a simplified pinhole or fisheye camera model, only light falling through a single point, i.e. the pinhole, is measured.

This invention may further use a light field camera that could capture an image from multiple different viewpoints and optionally with different focuses (focal planes) for the different viewpoints. Light field cameras are not limited to capturing only light falling through a single point but measure also a plurality of light intensities incident at different locations.

The camera may also be simulated by a virtual camera. A virtual camera is defined by a set of parameters and can create images of virtual objects or scenes, which are synthetic images. A crucial parameter of a virtual camera may be its pose, i.e. 3D translation and 3D orientation with respect to the virtual object or scene. Virtual cameras may map an object in 3D space onto a 2D space. For example, a virtual camera could map a 3D object onto a 2D image plane. The mapping of the virtual camera may be the pinhole camera model and in this case the camera's intrinsic parameters include the focal length and the principal point. Virtual cameras may also use the fisheye camera model or simulate arbitrary optics. Common implementations of virtual cameras use the OpenGL rasterization pipeline, ray casting or ray tracing. In any case virtual cameras create views (i.e. two-dimensional images) of (potentially 3D) virtual objects by approximations of the capturing process happening when a real camera images a real object. In Augmented Reality, the intrinsic and extrinsic parameters of a camera are usually chosen to be consistent either with a real camera or such that they correspond to a setup of an Augmented Reality system.

A thermal camera is a device for capturing thermal images that have encoded temperature for at least part of pixels in the thermal images. A thermal camera may be manufactured to include an array of microbolometers that are utilized as sensing elements.

Image:

An image is any data depicting or recording visual information or perception. An image could be a 2-dimensional image. An image could also encode a 3-dimensional space representation, e.g. a depth image. An image could also encode various pieces of information originating from different imaging devices. An image could be a real image or a synthetic image. A real image may be captured by a real camera. For example, the camera could capture an object of interest or a part of the object of interest in a real image. A synthetic image may be generated automatically by a computer or manually by a human. For example, a computer rendering program (e.g. based on OpenGL) may generate a synthetic image of an object of interest or a part of the object of interest. The synthetic image may be generated from a perspective projection as it is captured by a camera. The synthetic image may be generated according to orthogonal projection.

An image may capture an object that reflects, refracts, and/or emits light that is visible and/or invisible to human eyes. An image may be in the RGB format. It can also be applied to any other color format and also to monochrome images, for example in grayscale format or YUV format. For example, an infrared image could capture an object that reflects, refracts, and/or emits light that is invisible to the human eyes.

A depth image may be a 2D (color/grayscale) image with a corresponding depth map. A depth map typically encodes for each pixel a distance to the surface that is imaged in that pixel. Depth images do not need to be provided in the same resolution as a 2D image. A depth image may also be called 3D image or range data. A depth image may only provide depth data.

A thermal image typically is a 1-, 2- or multi-dimensional array of pixels, where at least some of the pixels in the image contain encoded temperature.

Image Feature:

A feature of an object is used to denote a piece of information related to the object. A piece of information may be visually perceivable to anatomical eyes or optical imaging devices. For example, a real object may emit or reflect visible light that could be captured by human eyes or cameras. A real object may also emit or reflect invisible light that could not be captured by human eyes, but could be captured by a camera (i.e. is optically perceivable). In another example, a feature may be associated with a virtual object (i.e. computer-generated object). A feature of a virtual object may be known or detectable in a computer or computer program, like computer graphic simulation software.

A feature may describe specific colors and/or structures, such as blobs, edge points, a particular region, and/or more complex structures of the real object. A feature may be represented by an image patch (e.g. pixel intensity) or a high level descriptor (e.g. SIFT, SURF). A feature may have 3D position and/or 3D orientation information in 3D Euclidean space relative to a coordinate system of the real object. This is often called a 3D feature. A 3D feature may be obtained from a 3D CAD model of the real object or manually provided. A feature may also be expressed in 2D space, called a 2D feature.

A feature (i.e. a piece of information related to a real object) may be extracted from an image of a real object captured by a camera, and thus a feature may have 2D image position and/or orientation in a coordinate system of the image. This is often called image feature. When a camera could provide depth information or a pose of the camera relative to a coordinate system of the 3D space (e.g. related to a real object or a real environment), a feature extracted from an image of the camera may also have 3D position and/or orientation information. Thus, an image feature may be a 2D feature or a 3D feature.

An image feature could be described by an equation that describes a geometric shape, for example a point, a ray, a straight line, a circle, a cone, or a cylinder. An image feature extracted from an image may also be described by at least one image region contained in the image. An image feature may also be described by at least one position or coordinate in the image or a coordinate system of the 3D space. For example, a point feature may be represented by a position in the image, while a line feature may be represented by two positions in the image.

Potential methods to detect features in an image that could be used in a method according to aspects of the invention include, but are not limited to, local extrema of Laplacian of Gaussian (LoG), Difference of Gaussians (DoG) or Determinant of Hessian (DoH), Maximally Stable Extremal Regions (MSER), Harris features, or learning-based corner detectors such as FAST. Also, methods that detect edges (edge elements) are suitable to be used in such methods. A feature detection method to be used is not limited to approaches working on a 2D intensity grayscale image, but can also be performed on images in any other color space, including RGB, HSV, and Lab, or range images that either exclusively contain depth information or provide both depth and intensity information.

A method to describe features can work on any of the types of images explained above and may include SIFT (Scale-invariant feature transform), SURF (Speeded Up Robust Feature), GLOH (Gradient Location and Orientation Histogram), HOG (Histogram of Oriented Gradients), 2.5D-SIFT, or any other method to compare local features including classification-based methods like Random Ferns. An image feature could be a SIFT feature or SURF feature for example.

Unreliable Object and Class of Unreliable Objects:

According to an embodiment, a distinction of what is an unreliable object is made with regard to the "target" computer vision algorithm (e.g. block 8.0 in FIG. 3). In general, any computer vision algorithm contains a set of assumptions with regard to the captured scene that are to be satisfied in order to achieve maximal accuracy and robustness of the algorithm. E.g. in case of a SLAM algorithm for dealing with a single rigid body, an unreliable object may be any other object in the scene that has its own dynamic or motion. The assumption of dealing with a single rigid object is violated when this motion is not consistent with the motion of other parts of the scene, that are present in the field of view of the camera. The presence of such unreliable objects in the scene can be seen as destructive in terms of accuracy and robustness of the SLAM algorithm. Therefore it is beneficial to detect and segment such objects, and then mark them as unreliable. This information is then known a priori to the SLAM algorithm, and steps may be taken to neglect the influence of unreliable objects, and consequently minimize the loss of accuracy and robustness incurred by the presence of unreliable objects.

A class of unreliable objects can be manually defined, or it can be learned automatically. In many cases, a class of unreliable objects can be manually defined and described. E.g. if humans are recognized as a class of unreliable objects, the goal of the description of the class of unreliable objects, i.e. humans, may be given via intrinsic human skin properties, e.g. physiological temperature thresholds.

According to a further embodiment, thermal properties of the class of objects can be learned empirically by observing and analyzing such objects in a camera image. E.g. let us assume that a set of arbitrary physical objects is denoted as an unreliable object class with regard to the selected computer vision algorithm. It is assumed that these objects share certain intrinsic thermal properties, which allow them to be clustered in one class. Let us now assume that a set of images of these objects is captured, and that these objects are segmented in the images, either manually or automatically. At least part of the images contains the encoded temperature of the pixels corresponding to imaged unreliable objects. Using available information, a class of unreliable objects can be described (see below "Description of unreliable object classes").

In an embodiment of the present invention, unreliable objects can be learned online, i.e. during the execution of a computer vision algorithm. E.g. let us assume that a SLAM algorithm for rigid object tracking and mapping is executed. During the execution of the algorithm, a set of inlier and outlier points is consecutively computed, as part of the pose optimization algorithm employed. Further, let us assume that thermal properties of image regions, corresponding to inlier and outlier points are known. In this embodiment, the intermediate goal is to separate clusters of outliers from the inliers. In order to achieve this, any inlier and outlier points can be mapped in the space which dimensions encode temperature of image regions corresponding to points, and optionally other data, such as texture information, depth information and similar, if available. Once the points are transformed into this space, the data can be clustered using decision trees, and known labels, i.e. a priori given classification of points in sets of inliers and outliers. Once the tree is learned, it may be used as a description of unreliable object classes to a priori reject points that are classified as outliers, based on the decision tree. In this case, every unique path in the decision tree that induces classification of a pixel as an outlier, can be regarded as a description of the single unreliable object class.

Description of Unreliable Object Classes:

A description of classes of unreliable objects may be based fully or partially on thermal properties of the unreliable objects. Further, the present invention also envisions descriptions which combine thermal properties with properties of unreliable object classes computed from imaging modalities other than thermal imaging modality. Inclusion of other modalities in the description of the object imply the link according to arrow L36 to be present in the method, as shown in FIG. 3. A description of the object could be achieved by one of the following methods or combinations thereof: fixed temperature ranges; single- or multi-variable probability density functions describing thermal properties of the object; probability density functions describing thermal properties, spatial properties and/or different image features originating from images captured by the additional imaging devices 3.0 (see FIG. 3); Fourier transform coefficients; wavelet transform coefficients; features originating from other single- or multi-variable frequency analysis methods. Further, unreliable objects can be described via classifiers, which are obtained by, but not limited to, one of following algorithms or combinations thereof: k nearest neighbor (kNN), support vector machines (SVM), Bayesian approaches, neural networks, deep belief networks, approaches based on decision trees, genetic algorithms, Markov processes, bootstrapping.

According to an embodiment of the invention, a description of classes of unreliable objects is provided with respect to their intrinsic thermal properties, which could be combined with, but not limited to, one of the following or combinations thereof: x-y position of the pixels in an image (e.g. the thermal image 4.0 or any image from the additional imaging device 3.0 in FIG. 3), X-Y-Z position of the pixels in a 3D space (e.g. in a 3D coordinate system of a real environment or a real object) etc. The intrinsic thermal properties of unreliable object classes may be provided in degrees Celsius, degrees Fahrenheit or Kelvin, temperature change in space and/or time.

According to an embodiment of the invention, a description of an unreliable object class can be provided as, but not limited to, one of the following or combinations thereof: thresholding function, probability density function, frequency response, classifier response, Fourier coefficients, wavelet coefficients, n-dimensional shape models, color characteristics, distinctive feature point histograms, visual words histograms etc.

In a further embodiment, as shown in FIG. 4, a set (1.1) of descriptions includes descriptions (O1 . . . ON) of arbitrary number (N) of classes of unreliable objects given by their specific minimal and maximal temperatures. Moreover, a class of unreliable objects can be described by a set of specific temperature ranges. Moreover, when utilization of other image modalities is envisioned, further thresholds can be added to describe the object. E.g., in case human skin represents a class of unreliable objects, it is known that the normal temperature of a human organism is approximately 36.7° C. The measured skin surface temperature might be different, given environment temperature, current body temperature of a person and technical properties of the thermal camera. Taking such influences into account, it is possible to determine an offset constant $\alpha$, which will define thresholds for human skin class as follows: O1=(36.7−$\alpha$) ° C.; O2=(36.7+$\beta$) ° C. In this sense, any pixel in the thermal image that has temperature between these O1 and O2 can be (initially) labelled as part of imaged human skin.

In another embodiment, classes of unreliable objects may be described with probability density functions with respect to temperature. In the embodiment presented in FIG. 5, classes of unreliable objects are described (descriptions (O1 . . . ON) of arbitrary number (N)) with normal distribution mean ($\mu$) and standard deviation ($\sigma$) (1.2) of temperatures, which could be either vectors or scalars, depending on a dimensionality of the distribution. An input variable of the probability density function is devised from an image region temperature. In case of multi-dimensional probability density functions, additional input variables could be, but are not limited to: pixel temperature, x-y position of the pixels in the image, X-Y-Z position of the pixels in the 3D space etc. Further, for each object, a probability thresholding function (t) can be provided, which is utilized to threshold pixels, or image regions, in detection and segmentation block (6.0). E.g. the probability thresholding function can be a binary function, according to which pixels, or image regions, which have probability higher than a threshold are labeled as parts of a respective unreliable object.

In an embodiment, an unreliable object class description is given in the form of a one-dimensional normal distribution of the object temperature.

In another embodiment, a four-dimensional probability density function is used to describe an unreliable object class, with following input variables: object temperature and three axes of 3D Euclidean space.

In a further embodiment, thermal properties are combined with spatial properties of unreliable objects, with the goal of obtaining a description of the class of unreliable objects. Let us assume that a system includes a thermal camera and a sensor for determining the gravity vector with regard to the image axes (e.g. a gravity sensor can be implemented using accelerometers and optionally gyroscopes). Further, let us assume that a class of unreliable objects is described by a set of Fourier coefficients, computed over the gravity aligned rows and columns of pixels. In order to detect and segment unreliable objects in the thermal image captured by the system, the image is rectified with regard to the gravity vector, e.g. determined by the accelerometer (and gyroscope). After the rectification process, the X-axis of the 2D thermal image is normal to the gravity vector, while the Y-axis is parallel to the gravity vector. Once the image is rectified, Fourier coefficients can be extracted for blocks of image regions (e.g. using 2D short time Fourier transform), and compared with the coefficients representing the description of the class of unreliable objects. If the coefficients are similar, up to a given threshold or set of thresholds, the image region is denoted as part of an unreliable object. Alternatively, instead of Fourier transform, other frequency analysis tools could be utilized (e.g. wavelets analysis).

In a further embodiment of the present invention, a description of unreliable objects may be given with regard to the temporal change of thermal properties of the object. Let us assume that a class of unreliable objects can be described with regard to the temporal change of thermal properties. E.g. an object in the image can be described using 2D Fourier transform, i.e. corresponding Fourier coefficients. Further, when thermal properties of the object change over time, a set of Fourier coefficients can be extracted, with each set computed at a certain point of time. A set of such coefficients can be used as a description of an unreliable object class. Further, a description of the object in such case could be obtained using the three-dimensional Fourier transform, where coordinates would be X and Y image axes, and time.

Thermal Properties:

A thermal property may be indicative of an intrinsic temperature of an object, or a spatio-temporal change of temperature of an object. A thermal property may be any value of a function, computed with regard to the temperature of an image region. Thermal properties of an object may include its average temperature, a spatio-temporal temperature distribution, a minimal and maximal temperature, derivatives or gradients of temperature, or any other function of a temperature of at least part of the object. Thermal properties of an object or an object class may be provided in degrees Celsius, degrees Fahrenheit or Kelvin. Thermal properties can also be computed with regard to thermal and spatial coordinates of objects. E.g. thermal properties can be given in form of Fourier coefficients of a temperature function. Here, temperature function may represent the spatial distribution of temperatures on the surface of the object, as captured in the thermal image.

Computer Vision Algorithm:

A computer vision algorithm may be any algorithm that takes as an input one or more images, e.g. of possibly different modalities. With regard to the present invention, a computer vision algorithm may benefit from a detection and segmentation of objects, belonging to classes of unreliable objects. In the present invention, classes of unreliable objects may be described with regard to properties of the computer vision algorithm. E.g. a computer vision algorithm may be SLAM, various localization, mapping and tracking algorithms, detection and recognition algorithms for objects, images and/or scenes, 3D reconstruction algorithms etc. A computer vision algorithm may also describe at least part of an input image, e.g. by means of creating histograms of image intensities or functions thereof. A computer vision algorithm may further aim at registering (at least part of) an input image with (at least part of) another image using an image registration method such as Inverse Compositional, Inverse Additive, Forward Compositional, Forward Additive, Efficient Second Order Minimization, or any other method that determines a collineation warping function (see references [19, 20, 21]).

REFERENCES

[1] Jean Ponce, Martial Hebert, Cordelia Schmid, and Andrew Zisserman, editors. *Toward Category-Level Object Recognition*, volume 4170 of *Lecture Notes in Computer Science*. Springer, 2006.
[2] U.S. Pat. No. 5,557,684.
[3] R. Das, C. Isci, J. O. Kephart, and J. Lenchner. Automated object classification using temperature profiles, Nov. 21, 2013. U.S. patent application Ser. No. 13/475,086.
[4] Carlos R. del Blanco, Fernando Jaureguizar, Luis Salgado, and Narciso Garcia. Target detection through robust motion segmentation and tracking restrictions in aerial flir images. In ICIP (5), pages 445-448. IEEE, 2007.
[5] Ronan Fablet, Philippe Rostaing, and Christophe Collet. Motion segmentation and cloud tracking on noisy infrared image sequences, 1998.
[6] Ju Han and Bir Bhanu. Fusion of color and infrared video for moving human detection. Pattern Recogn., 40(6): 1771-1784, June 2007.
[7] S. Y. Hyung, K. S. Roh, S. J. Yoon, and S. H. Ahn. Method of building map of mobile platform in dynamic environment, Jun. 24, 2010. U.S. patent application Ser. No. 12/654,037.
[8] Georg Klein and David Murray. Parallel tracking and mapping for small AR workspaces. In Proc. Sixth IEEE and ACM International Symposium on Mixed and Augmented Reality (ISMAR'07), Nara, Japan, November 2007.
[9] Timo Ojala and Matti Pietikainen. Unsupervised texture segmentation using feature distributions. In Proceedings of the 9th International Conference on Image Analysis and Processing—Volume I—Volume I, ICIAP '97, pages 311-318, London, UK, UK, 1997. Springer-Verlag.
[10] Jun Shimamura, Masashi Morimoto, and Hideki Koike. Robust vslam for dynamic scenes. In MVA, pages 344-347, 2011.
[11] Josef Sivic and Andrew Zisserman. Video google: Efficient visual search of videos. In Jean Ponce, Martial Hebert, Cordelia Schmid, and Andrew Zisserman, editors, Toward Category-Level Object Recognition, volume 4170 of Lecture Notes in Computer Science, pages 127-144. Springer, 2006.
[12] Wei Tan, Haomin Liu, Zilong Dong, Guofeng Zhang, and Hujun Bao. Robust monocular slam in dynamic environments. In Mixed and Augmented Reality (ISMAR), 2013 IEEE International Symposium on, pages 209-218, October 2013.
[13] Sam S. Tsai, David M. Chen, Gabriel Takacs, Vijay Chandrasekhar, Ramakrishna Vedantham, Radek Grzeszczuk, and Bernd Girod. Fast geometric re-ranking for image-based retrieval. In ICIP, pages 1029-1032. IEEE, 2010.
[14] Danping Zou and Ping Tan. Coslam: Collaborative visual slam in dynamic environments. Pattern Analysis and Machine Intelligence, IEEE Transactions on, 35(2): 354-366, February 2013.
[15] WO 2014/015889 A1
[16] CN 102612704 A
[17] US 2012/0219188 A1
[18] EP 2491529 A1
[18] CN 103597513 A
[20] EP 2689393 A1
[21] US 2014/0086494 A

The invention claimed is:

1. A method for determining at least one property related to at least part of a real environment, comprising:
   obtaining, from a first camera, a thermal image capturing a real environment;
   identifying an object in the thermal image based on thermal properties in the thermal image corresponding to thermal properties of at least one class of real objects;
   determining a region in the thermal image corresponding to the object;
   obtaining, from a second camera, a visual image capturing the real environment;
   extracting a set of image features from a first portion of the visual image that excludes a second portion of the visual image corresponding to the determined region in the thermal image; and
   performing a computer vision operation on the visual image using the extracted image features from the first portion of the visual image.

2. The method of claim 1, wherein determining the region in the thermal image corresponding to the object comprises determining the region in the thermal image comprises a first class of object.

3. The method of claim 2, wherein the first class of object comprises one or more of a group consisting of potentially moving objects and potentially occluding objects.

4. The method of claim 1, further comprising:
   after obtaining the visual image, detecting that the first portion of the real environment comprises the object by determining a probability that the first portion of the real environment comprises the object based on the thermal property and a visual property of the visual image.

5. The method of claim 1, further comprising:
   identifying a subset of image features:
      identifying a first set of pixels in the thermal image corresponding to the object; and
      mapping the first set of pixels in the thermal image to a second set of pixels in the visual image.

6. The method of claim 5, wherein excluding the identified pixels further comprises:
   segmenting the visual image according to the mapped pixels in the visual image.

7. The method of claim 1, wherein the object comprises a portion of a user.

8. A non-transitory computer readable medium comprising computer readable code for determining at least one property related to at least part of a real environment, the computer readable code executable by one or more processors to:
   obtain, from a first camera, a thermal image capturing a real environment;
   identify an object in the thermal image based on thermal properties in the thermal image that correspond to thermal properties of at least one class of real objects;

determine a region in the thermal image corresponding to the object;

obtain, from a second camera, a visual image capturing the real environment;

extract a set of image features from a first portion of the visual image that excludes a second portion of the visual image corresponding to the determined region in the thermal image; and perform a computer vision operation on the visual image using the extracted image features from the first portion of the visual image.

9. The non-transitory computer readable medium of claim 8, wherein the computer readable code to determine the region in the thermal image corresponding to the object comprises computer readable code to determine the region in the thermal image comprises a first class of object.

10. The non-transitory computer readable medium of claim 9, wherein the first at least one class of real objects comprises one or more of a group consisting of potentially moving objects and potentially occluding objects.

11. The non-transitory computer readable medium of claim 8, further comprising computer readable code to:

detect that the first portion of the real environment comprises the object by determining a probability that the first portion of the real environment comprises the object based on the thermal property and a visual property of the visual image.

12. The non-transitory computer readable medium of claim 8, further comprising computer readable code to:

identify a subset of the image features by identifying a first set of pixels in the thermal image corresponding to the object and mapping the first set of pixels in the thermal image to a second set of pixels in the visual image.

13. The non-transitory computer readable medium of claim 12, further comprising computer readable code wthe identified pixels by segment segmenting the visual image according to the mapped pixels in the visual image.

14. The non-transitory computer readable medium of claim 8, wherein the object comprises a portion of a user.

15. A system for determining at least one property related to at least part of a real environment, comprising:

one or more processors; and one or more computer readable media comprising computer readable code executable by the one or more processors to:

obtain, from a first camera, a thermal image capturing a real environment;

identify an object in the thermal image based on thermal properties in the thermal image that correspond to thermal properties of at least one class of real objects;

determine a region in the thermal image corresponding to the object;

obtain, from a second camera, a visual image capturing the real environment;

extract a set of image features from a first portion of the visual image that excludes a second portion of the visual image corresponding to the determined region in the thermal image; and perform a computer vision operation on the visual image using the extracted image features from the first portion of the visual image.

16. The system of claim 15, wherein the computer readable code to determine the region in the thermal image corresponding to the object comprises computer readable code to determine the region in the thermal image comprises a first class of obj ect.

17. The system of claim 16, wherein the first class of object comprises one or more of a group consisting of potentially moving objects and potentially occluding objects.

18. The system of claim 15, further comprising wherein computer readable code to detect that the first portion of the real environment by determining a probability that the first portion of the real environment comprises the object based on the thermal property and a visual property of the visual image.

19. The system of claim 15, further comprising computer readable code to identify a subset of the image features by identifying a first set of pixels in the thermal image corresponding to the object and mapping the first set of pixels in the thermal image to a second set of pixels in the visual image.

20. The system of claim 19, further comprising computer readable code to exclude the identified pixels by segmenting the visual image according to the mapped pixels in the visual image.

* * * * *